(12) United States Patent  
Roberts

(10) Patent No.: US 9,218,532 B2  
(45) Date of Patent: Dec. 22, 2015

(54) LIGHT ID ERROR DETECTION AND CORRECTION FOR LIGHT RECEIVER POSITION DETERMINATION

(71) Applicant: Intel Corporation, Santa Clara, CA (US)

(72) Inventor: Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 13/629,747

(22) Filed: Sep. 28, 2012

(65) Prior Publication Data

US 2014/0093126 A1    Apr. 3, 2014

(51) Int. Cl.
  *G06K 9/00*    (2006.01)
  *G06K 9/32*    (2006.01)
  *G06K 9/62*    (2006.01)

(52) U.S. Cl.
  CPC .............. *G06K 9/00691* (2013.01); *G06K 9/32* (2013.01); *G06K 9/6292* (2013.01)

(58) Field of Classification Search
  None
  See application file for complete search history.

(56) References Cited

U.S. PATENT DOCUMENTS

| | | | |
|---|---|---|---|
| 4,422,099 A | 12/1983 | Wolfe | |
| 5,317,635 A | 5/1994 | Stirling et al. | |
| 5,394,259 A | 2/1995 | Takahara | |
| 5,531,642 A | 7/1996 | Shiomi et al. | |
| 5,577,733 A | 11/1996 | Downing | |
| 5,600,471 A | 2/1997 | Hirohashi et al. | |
| 5,903,373 A | 5/1999 | Welch et al. | |
| 5,970,208 A | 10/1999 | Shim | |
| 6,400,482 B1 | 6/2002 | Lupton et al. | |
| 6,570,694 B1 | 5/2003 | Yegnanarayanan | |
| 6,594,050 B2 | 7/2003 | Jannson et al. | |
| 6,794,831 B2 | 9/2004 | Leeb et al. | |
| 6,819,878 B1 | 11/2004 | King et al. | |
| 6,941,076 B1 | 9/2005 | Adams et al. | |
| 6,954,591 B2 | 10/2005 | Lupton et al. | |

(Continued)

FOREIGN PATENT DOCUMENTS

| | | |
|---|---|---|
| EP | 1436952 A1 | 7/2004 |
| EP | 2106041 A1 | 9/2009 |

(Continued)

OTHER PUBLICATIONS

International Search Report and Written Opinion received for Patent Application No. PCT/US2011/060578, mailed on Mar. 15, 2012, 10 pages.

(Continued)

*Primary Examiner* — Vikkram Bali  
(74) *Attorney, Agent, or Firm* — Garrett IP, LLC

(57) ABSTRACT

A light receiver records images of light beams originating from a neighborhood of lights, and demodulates identifiers (IDs) from them at determined image positions. The receiver retrieves a set of neighbor IDs for each demodulated ID and a real-world position of the corresponding light. The receiver cross-references the demodulated IDs against the retrieved sets of neighbor IDs to reveal errors in the demodulated IDs. The receiver corrects the errors to produce correct IDs each indexing a real-world position that is correctly matched to one of the determined light beam positions. The receiver determines a position of the receiver relative to the light transmitter based on the correctly matched real-world and determined light beam positions.

23 Claims, 33 Drawing Sheets

(56) References Cited

U.S. PATENT DOCUMENTS

| | | |
|---|---|---|
| 6,965,464 B2 | 11/2005 | Mossberg |
| 7,149,256 B2 | 12/2006 | Vrazel et al. |
| 7,352,972 B2 | 4/2008 | Franklin |
| 7,415,212 B2 | 8/2008 | Matsushita et al. |
| 7,689,130 B2 | 3/2010 | Ashdown |
| 7,920,943 B2 | 4/2011 | Campbell et al. |
| 7,949,259 B2 | 5/2011 | Suzuki |
| 8,070,325 B2 | 12/2011 | Zampini et al. |
| 8,238,014 B2 | 8/2012 | Kucharski et al. |
| 8,260,137 B2 | 9/2012 | Linnartz |
| 8,334,901 B1 | 12/2012 | Ganick et al. |
| 8,417,124 B2 | 4/2013 | Ford |
| 8,488,971 B2 | 7/2013 | Linnartz et al. |
| 8,494,367 B2 | 7/2013 | Linnartz |
| 8,520,065 B2 | 8/2013 | Staats et al. |
| 8,579,437 B2 | 11/2013 | Su et al. |
| 8,588,616 B2 | 11/2013 | Langer et al. |
| 8,588,621 B2 | 11/2013 | Dahan et al. |
| 8,620,165 B2 | 12/2013 | Kim et al. |
| 8,630,549 B2 | 1/2014 | Kim et al. |
| 8,665,508 B2 | 3/2014 | Kucharski et al. |
| 8,693,878 B2 | 4/2014 | Schenk et al. |
| 8,729,835 B2 | 5/2014 | Henig et al. |
| 8,737,842 B2 | 5/2014 | Schenk et al. |
| 8,818,204 B2 | 8/2014 | Roberts |
| 8,861,976 B2 | 10/2014 | Roberts et al. |
| 2001/0055136 A1 | 12/2001 | Horiuchi et al. |
| 2002/0085094 A1 | 7/2002 | Teuchert |
| 2002/0089722 A1 | 7/2002 | Perkins et al. |
| 2002/0145776 A1 | 10/2002 | Chow et al. |
| 2002/0167701 A1 | 11/2002 | Hirata |
| 2003/0081287 A1 | 5/2003 | Jannson et al. |
| 2004/0120025 A1 | 6/2004 | LeHoty |
| 2004/0208616 A1 | 10/2004 | Melendez et al. |
| 2005/0002673 A1 | 1/2005 | Okano et al. |
| 2005/0036573 A1 | 2/2005 | Zhang et al. |
| 2005/0047392 A1 | 3/2005 | Ashwood Smith |
| 2005/0135527 A1 | 6/2005 | Masui et al. |
| 2006/0204172 A1 | 9/2006 | Shahar |
| 2006/0239689 A1 | 10/2006 | Ashdown |
| 2006/0269287 A1 | 11/2006 | Bidmead et al. |
| 2007/0177161 A1 | 8/2007 | Ishii et al. |
| 2008/0049685 A1 | 2/2008 | Becker et al. |
| 2008/0205900 A1 | 8/2008 | Cole et al. |
| 2008/0298801 A1 | 12/2008 | King et al. |
| 2009/0196615 A1 | 8/2009 | Kauffman |
| 2009/0208221 A1 | 8/2009 | Sasai |
| 2009/0228755 A1 | 9/2009 | Franovici |
| 2009/0243815 A1 | 10/2009 | Tolli |
| 2009/0247152 A1 | 10/2009 | Manne |
| 2010/0060972 A1 | 3/2010 | Kucharski et al. |
| 2010/0208236 A1 | 8/2010 | Damink et al. |
| 2010/0209119 A1 | 8/2010 | Lee et al. |
| 2010/0250125 A1 | 9/2010 | Lundberg et al. |
| 2010/0271476 A1 | 10/2010 | Damink et al. |
| 2010/0290516 A1 | 11/2010 | Lee et al. |
| 2010/0309958 A1 | 12/2010 | Lakkis |
| 2010/0316380 A1 | 12/2010 | de Lind van Wijngaarden |
| 2011/0002695 A1 | 1/2011 | Choi et al. |
| 2011/0069971 A1 | 3/2011 | Kim et al. |
| 2011/0075581 A1 | 3/2011 | Mihota |
| 2011/0144941 A1 | 6/2011 | Roberts |
| 2011/0164881 A1 | 7/2011 | Rajagopal et al. |
| 2011/0274429 A1 | 11/2011 | Caplan et al. |
| 2012/0008961 A1 | 1/2012 | Chen et al. |
| 2012/0033965 A1 | 2/2012 | Zhang et al. |
| 2012/0076498 A1 | 3/2012 | Sayeed et al. |
| 2012/0099868 A1 | 4/2012 | Fischer et al. |
| 2012/0109356 A1 | 5/2012 | Kong et al. |
| 2012/0162633 A1 | 6/2012 | Roberts et al. |
| 2012/0315036 A1 | 12/2012 | Kucharski et al. |
| 2013/0028609 A1 | 1/2013 | Staats et al. |
| 2013/0028612 A1 | 1/2013 | Ryan et al. |
| 2013/0126713 A1 | 5/2013 | Haas et al. |
| 2013/0141555 A1* | 6/2013 | Ganick et al. ............ 348/61 |
| 2013/0170841 A1 | 7/2013 | Liu et al. |
| 2013/0247117 A1 | 9/2013 | Yamada et al. |
| 2013/0287403 A1 | 10/2013 | Roberts |
| 2013/0301569 A1 | 11/2013 | Wang et al. |
| 2014/0003817 A1 | 1/2014 | Roberts et al. |
| 2014/0003823 A1 | 1/2014 | Roberts et al. |
| 2014/0006907 A1 | 1/2014 | Roberts et al. |
| 2014/0064739 A1 | 3/2014 | Chen et al. |
| 2014/0086587 A1 | 3/2014 | Roberts et al. |
| 2014/0086590 A1 | 3/2014 | Ganick et al. |
| 2014/0093234 A1 | 4/2014 | Roberts et al. |
| 2014/0093238 A1 | 4/2014 | Roberts |
| 2014/0093249 A1 | 4/2014 | Roberts et al. |
| 2014/0153668 A1 | 6/2014 | Xi et al. |
| 2014/0219663 A1 | 8/2014 | Roberts |
| 2014/0280316 A1* | 9/2014 | Ganick et al. ............ 707/769 |
| 2014/0308048 A1 | 10/2014 | Roberts et al. |

FOREIGN PATENT DOCUMENTS

| | | |
|---|---|---|
| JP | 2010014408 A | 1/2010 |
| JP | 2010-283616 A | 12/2010 |
| JP | 5031427 B2 | 9/2012 |
| KR | 1020060034883 A | 4/2006 |
| KR | 100761011 B1 | 9/2007 |
| KR | 1020100083578 A | 7/2010 |
| KR | 1020110083961 A | 7/2011 |
| KR | 1020120006306 A | 1/2012 |
| WO | 2008113861 A2 | 9/2008 |
| WO | 2011/064342 A1 | 6/2011 |
| WO | 2012037528 A2 | 3/2012 |
| WO | 2012/087944 A2 | 6/2012 |
| WO | 2013048502 A1 | 4/2013 |
| WO | 2013165751 A1 | 4/2013 |
| WO | 2013074065 A1 | 5/2013 |
| WO | 2013 081595 A1 | 6/2013 |
| WO | 2013/101027 A1 | 7/2013 |
| WO | 2014046757 A1 | 3/2014 |
| WO | 2014 051754 A1 | 4/2014 |
| WO | 2014051767 A1 | 4/2014 |
| WO | 2014051768 A1 | 4/2014 |
| WO | 2014051783 A1 | 4/2014 |

OTHER PUBLICATIONS

International Search Report and Written Opinion received for Patent Application No. PCT/US2011/054441, mailed on Apr. 23, 2012, 11 pages.

Roberts, et al., "Methods and Arrangements for Frequency Shift Communications by Undersampling", PCT Patent Application No. PCT/US2011/060578, filed on Nov. 14, 2011, 33 Pages.

Roberts, Richard R., "Methods and Arrangements for Frequency Shift Communications", PCT Patent Application No. PCT/US2011/054441, filed on Sep. 30, 2011, 23 Pages.

Roberts, et al., "Methods and Arrangements for Error Correction in Decoding Data From an Electromagnetic Radiator", U.S. Appl. No. 13/539,354, filed Jun. 30, 2012, 45 Pages.

Roberts, et al., "Methods and Arrangements for Generating a Waveform for Frequency Shift Keying Communications", U.S. Appl. No. 13/539,351, filed Jun. 30, 2012, 47 Pages.

Yoshino, et al., "High-accuracy Positioning System using Visible LED Lights and Image Sensor", 1-4244-1463-6/08 RWS 2008 IEEE, pp. 439-442.

Tanaka, et al., "New Position Detection Method using Image Sensor and Visible Light LEDs", IEEE Second International Conference on Machine Vision, Dec. 28-30, 2009, pp. 150-153.

Horikawa, et al., "Pervasive Visible Light Positioning System using White LED Lighting", vol. 103; No. 721(CS2003 178-197), 2004, pp. 93-99.

Roberts, et al., "Methods and Apparatus for Multiphase Sampling of Modulated Light", U.S. Appl. No. 13/630,066, filed Sep. 28, 2012, 71 Pages.

Roberts, Richard R., "Location Detection System", PCT Patent Application No. PCT/US2011/62578, filed on Nov. 30, 2011, 51 Pages.

(56) References Cited

OTHER PUBLICATIONS

Gopalakrishnan, et al., "Location Based Technology for Smart Shopping Services", PCT Patent Application No. PCT/US2011/067749, filed on Dec. 29, 2011, 18 Pages.
International Search Report with Written Opinion received for PCT Patent Application No. PCT/US2013/037787, mailed Aug. 12, 2013, 9 pages.
International search Report and Written Opinion received for PCT Patent Application No. PCT/US2013/047347, mailed on Aug. 27, 2013, 13 Pages.
International Search Report and Written Opinion received for PCT Patent Application No. PCT/US2013/047350, mailed on Sep. 25, 2013, 11 Pages.
International Search Report and Written Opinion received for PCT Patent Application No. PCT/US2013/047772 mailed on Sep. 27, 2013, 10 Pages.
Office Action Received for U.S. Appl. No. 13/539,354, Mailed on Nov. 21, 2013.
International Search Report and Written Opinion received for PCT Patent Application No. PCT/US2013/047343, mailed on Oct. 7, 2013.
Notice of Allowance received for U.S. Appl. No. 13/460,224 mailed on Apr. 16, 2014.
Notice of Allowance received for U.S. Appl. No. 13/539,354, mailed on Apr. 1, 2014.
International Preliminary Report on Patentability received for PCT Patent Application No. PCT/US2011/054441, mailed on Apr. 10, 2014.
International Preliminary Report on Patentability and Written Opinion Received for PCT Patent Application No. PCT/US2011/060578, mailed on May 20, 2014, 5 pages.
International Search Report received for PCT Patent Application No. PCT/US2013/046224, mailed on Sep. 16, 2013, 3 pages.
Extended European Search Report received for European Patent Application No. 11873073.8, mailed on Apr. 8, 2015, 11 pages.
Non-Final Office Action received for U.S. Appl. No. 13/460,224, mailed on Oct. 11, 2013, 12 pages.
Notice of Allowance received for U.S. Appl. No. 13/538,888, mailed on Jun. 17, 2014, 11 pages.
Non-Final Office action received for U.S. Appl. No. 13/539,351, mailed on Feb. 24, 2015, 8 pages.
Notice of Allowance received for U.S. Appl. No. 13/539,354, mailed on Apr. 30, 2015, 7 pages.
Notice of Allowance received for U.S. Appl. No. 13/539,354, mailed on Dec. 22, 2014, 7 pages.
Notice of Allowance received for U.S. Appl. No. 13/539,354, mailed on Aug. 29, 2014, 7 pages.
Non-Final Office Action received for U.S. Appl. No. 13/539,354, mailed on Nov. 21, 2013, 6 pages.
Notice of Allowance received for U.S. Appl. No. 13/625,361, mailed on Dec. 17, 2014, 10 pages.
Non-Final Office Action received for U.S. Appl. No. 13/625,361, mailed on Jul. 31, 2014, 11 pages.
Non-Final Office Action received for U.S. Appl. No. 13/629,843, mailed on Nov. 7, 2014, 19 pages.
Notice of Allowance received for U.S. Appl. No. 13/629,843, mailed on Jun. 16, 2015, 9 pages.
Non-Final Office Action received for U.S. Appl. No. 13/631,909, mailed on Jun. 5, 2015, 13 pages.
Non-Final Office action received for U.S. Appl. No. 13/977,695, mailed on Apr. 7, 2015, 16 pages.
Notice of Allowance received for U.S. Appl. No. 13/977,696, mailed on Jun. 22, 2015, 8 pages.
IEEE, "Part 15.7: PHY and MAC standard for shortrange wireless optical communication using visible light", IEEE Wireless Mac and Phy Specifications for Vpans, Std 802.15.7 DRAFT, XP017637045, Nov. 14, 2010, pp. 1-296.
International Preliminary Report on Patentability and Written Opinion Received for PCT Patent Application No. PCT/US2013/037787, mailed on Nov. 13, 2014, 6 pages.
International Preliminary Report on Patentability and Written Opinion Received for PCT Patent Application No. PCT/US2013/046224, mailed on Apr. 9, 2015, 8 pages.
International Preliminary Report on Patentability and Written Opinion Received for PCT Patent Application No. PCT/US2013/047343, mailed on Apr. 9, 2015, 8 pages.
International Preliminary Report on Patentability and Written Opinion Received for PCT Patent Application No. PCT/US2013/047347, mailed on Apr. 9, 2015, 10 pages.
International Preliminary Report on Patentability and Written Opinion Received for PCT Patent Application No. PCT/US2013/047350, mailed on Apr. 2, 2015, 8 pages.
International Preliminary Report on Patentability and Written Opinion Received for PCT Patent Application No. PCT/US2013/047772, mailed on Apr. 9, 2015, 7 pages.
Sha'Ameri, et al., "Detection of Binary Data for FSK Digital Modulation Signals Using Spectrum Estimation Techniques", IEEE, Telecommunication Technology, NCTT Proceedings, 4th National Conference, XP010636785, ISBN: 978-0-7803-7773-8, Jan. 14, 2013, pp. 155-158.
Uchiyama, et al., "Photogrammetric System using Visible Light Communication", IEEE, 2008, pp. 1771-1776.
Yamazato, et al., "Experimental Results on Simple Distributed Cooperative Transmission Scheme with Visible Light Communication", IEICE Trans. Commun., vol. E93-B, No. II, XP-001559468, Nov. 1, 2010, pp. 2959-2962.

\* cited by examiner

1100

In a light receiver, sampling and recording spatially-separated, modulated anchor light beams from anchor lights and non-anchor light beams from non-anchor lights of a light array, to produce a sequence of images of the light array — 1105

Demodulating light identifiers (IDs) from the recorded anchor light beams — 1110

Accessing a predetermined map of the light array based on the demodulated light IDs — 1115

Positionally aligning the map with the recorded anchor light beams — 1120

Accessing real-world positions of the anchor and the non-anchor lights in the light array based on the aligned map — 1125

Determining a position of the light receiver relative to the light array based on the accessed light positions — 1130

FIG. 11

Decoding error: light at <3,3> is burnt out and light <2,2> is mistakenly demodulated as <4,10>

Case 1 (full set) with 5 lights    Expected Position Table

| ID | Coordinates | Neighbor Set |
|---|---|---|
| 1 | $<x_1,y_1,z_1>$ | 2, 3, 4, 5 |
| 2 | $<x_2,y_2,z_2>$ | 1, 3, 4, 5 |
| 3 | $<x_3,y_3,z_3>$ | 1, 2, 4, 5 |
| 4 | $<x_4,y_4,z_4>$ | 1, 2, 3, 5 |
| 5 | $<x_5,y_5,z_5>$ | 1, 2, 3, 4 |

Case 1 with 5 lights and no errors    Constructed Position Table

| ID | Coordinates | Neighbor Set |
|---|---|---|
| 1 | $<x_1,y_1,z_1>$ | 2, 3, 4, 5 |
| 2 | $<x_2,y_2,z_2>$ | 1, 3, 4, 5 |
| 3 | $<x_3,y_3,z_3>$ | 1, 2, 4, 5 |
| 4 | $<x_4,y_4,z_4>$ | 1, 2, 3, 5 |
| 5 | $<x_5,y_5,z_5>$ | 1, 2, 3, 4 |

Histogram
Cross-reference
Statistics $k=5; L=4; j=L+1=5; m=j-k=0; n=p=0; min<=n-1=n/a$

*Action: none ... no errors*

EXAMPLE 1

Case 1 with 5 lights and one error — Constructed Position Table

| ID | Coordinates | Neighbor Set |
|---|---|---|
| 1 | $<x_1,y_1,z_1>$ | 2, 3, 4, 5 |
| 2 | $<x_2,y_2,z_2>$ | 1, 3, 4, 5 |
| 3 | $<x_3,y_3,z_3>$ | 1, 2, 4, 5 |
| 9 | $<x_9,y_9,z_9>$ | 8, 10, 11 |
| 5 | $<x_5,y_5,z_5>$ | 1, 2, 3, 4 |

Histogram
Cross-reference
Statistics k=5; L=4; j=L+1=5; m=j-k=0; n=p=1; min<=n-1=0

*Action: replace ID#9 with ID#4 along with related coordinates*

EXAMPLE 2

Case 1 with 5 lights and two errors — Constructed Position Table

| ID | Coordinates | Neighbor Set |
|---|---|---|
| 1 | $<x_1,y_1,z_1>$ | 2, 3, 4, 5 |
| 7 | $<x_7,y_7,z_7>$ | 8, 9, 10, 11, 12 |
| 3 | $<x_3,y_3,z_3>$ | 1, 2, 4, 5 |
| 4 | $<x_4,y_4,z_4>$ | 1, 2, 3, 5 |
| 14 | $<x_{14},y_{14},z_{14}>$ | 15, 16 |

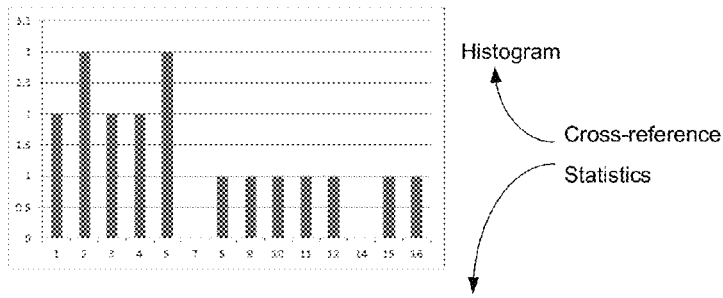

Histogram
Cross-reference
Statistics $k=5; L=4; j=L+1=5; m=j-k=0; n=p=2; min<=n-1=1$

*Action: ID#7 and ID#14 are erroneous and should be replaced with ID#2 and ID#5; make a request for these coordinates.* — Subsequently Retrieved Info.

| ID | Coordinates | Neighbor Set |
|---|---|---|
| 2 | $<x_2,y_2,z_2>$ | 1, 3, 4, 5 |
| 5 | $<x_5,y_5,z_5>$ | 1, 2, 3, 4 |

*Action: calculate the Euclidean distance of ID#2 and ID#5 from the lights representing the correctly received ID numbers and place identify them in the image.*

EXAMPLE 3

FIG. 16C

Case 1 with 5 lights and three errors — Constructed Position Table

| ID | Coordinates | Neighbor Set |
|---|---|---|
| 10 | $<x_{10}, y_{10}, z_{10}>$ | 9, 11 |
| 2 | $<x_2, y_2, z_2>$ | 1, 3, 4, 5 |
| 13 | $<x_{13}, y_{13}, z_{13}>$ | 14, 15 |
| 4 | $<x_4, y_4, z_4>$ | 1, 2, 3, 5 |
| 17 | $<x_{17}, y_{17}, z_{17}>$ | 18 |

Histogram — Cross-reference — Statistics $k=5;\ L=2;\ j=L+1=3;\ m=3-k=-2;\ n=p=3;\ min<=2-1=1$

*Action: uncorrectable number of errors*

EXAMPLE 4

Case 1 (full set) with 4 lights  — Expected Position Table

| ID | Coordinates | Neighbor Set |
|----|-------------|--------------|
| 1  | $<x_1,y_1,z_1>$ | 2, 3, 4 |
| 2  | $<x_2,y_2,z_2>$ | 1, 3, 4 |
| 3  | $<x_3,y_3,z_3>$ | 1, 2, 4 |
| 4  | $<x_4,y_4,z_4>$ | 1, 2, 3 |

Case 1 with 4 lights and one error — Constructed Position Table

| ID | Coordinates | Neighbor Set |
|----|-------------|--------------|
| 1  | $<x_1,y_1,z_1>$ | 2, 3, 4 |
| 10 | $<x_{10},y_{10},z_{10}>$ | null |
| 3  | $<x_3,y_3,z_3>$ | 1, 2, 4 |
| 4  | $<x_4,y_4,z_4>$ | 1, 2, 3 |

Histogram  
Cross-ref. Statistics $k=4; L=3; j=L+1=4; m=j-k=0; n=p=2; \min<=n-1=1$

*Action: ID#10 is replaced it with ID#2.*

EXAMPLE 5

Case 2 (less than a full set) with a set of 6 and 5 lights (one missing)

Expected Position Table

| ID | Coordinates | Neighbor Set |
|---|---|---|
| 1 | $<x_1,y_1,z_1>$ | 2, 3, 4, 5, 6 |
| 2 | $<x_2,y_2,z_2>$ | 1, 3, 4, 5, 6 |
| 3 | $<x_3,y_3,z_3>$ | 1, 2, 4, 5, 6 |
| 4 | $<x_4,y_4,z_4>$ | 1, 2, 3, 5, 6 |
| 5 | $<x_5,y_5,z_5>$ | 1, 2, 3, 4, 6 |
| 6 | $<x_6,y_6,z_6>$ | 1, 2, 3, 4, 5 |

Case 2 with 5 lights and no errors

Constructed Position Table

| ID | Coordinates | Neighbor Set |
|---|---|---|
| 1 | $<x_1,y_1,z_1>$ | 2, 3, 4, 5, 6 |
| 2 | $<x_2,y_2,z_2>$ | 1, 3, 4, 5, 6 |
| 4 | $<x_4,y_4,z_4>$ | 1, 2, 3, 5, 6 |
| 5 | $<x_5,y_5,z_5>$ | 1, 2, 3, 4, 6 |
| 6 | $<x_6,y_6,z_6>$ | 1, 2, 3, 4, 5 |

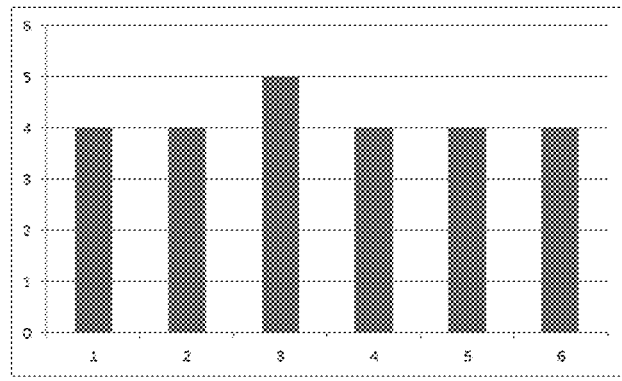

Histogram

Cross-ref Statistics $k=5; L=5; j=L+1=6; m=j-k=1; n=p-m=0; min<=n-1=0$

*Action: ID#3 is missing but since n=0 there are no errors in the remaining IDs.*

EXAMPLE 7

FIG. 16G

Case 2 with 5 lights and one error — Constructed Position Table

| ID | Coordinates | Neighbor Set |
|---|---|---|
| 1 | $<x_1,y_1,z_1>$ | 2, 3, 4, 5, 6 |
| 2 | $<x_2,y_2,z_2>$ | 1, 3, 4, 5, 6 |
| 9 | $<x_9,y_9,z_9>$ | 10 |
| 5 | $<x_5,y_5,z_5>$ | 1, 2, 3, 4, 6 |
| 6 | $<x_6,y_6,z_6>$ | 1, 2, 3, 4, 5 |

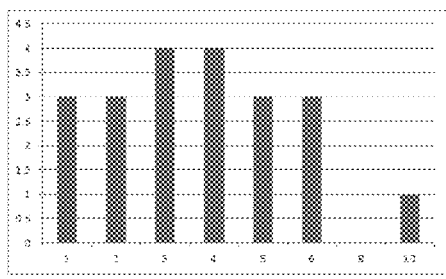

Histogram — Cross-reference Statistics $k=5; L=5; j=L+1=6; m=j-k=1; n=p-m=0; min<=n-1=0$

*Action: ID#3 and ID#4 belong to the set. We next submit a request for the coordinates of ID#3 and ID#4.*

Subsequently Retrieved Info.

| ID | Coordinates | Neighbor Set |
|---|---|---|
| 3 | $<x_4,y_4,z_4>$ | 1, 2, 4, 5, 6 |
| 4 | $<x_5,y_5,z_5>$ | 1, 2, 3, 5, 6 |

*Action: We next calculate the Euclidean distance from ID#3 and ID#4 to the estimated position of the unidentified light to determine the correct ID*

EXAMPLE 8

FIG. 16H

3. Case 2 (less than a full set) with 6 lights and two missing

*Expected Position Table*

| ID | Coordinates | Neighbor Set |
|---|---|---|
| 3 | $<x_3,y_3,z_3>$ | 1, 2, 4, 5, 6 |
| 4 | $<x_4,y_4,z_4>$ | 1, 2, 3, 5, 6 |
| 5 | $<x_5,y_5,z_5>$ | 1, 2, 3, 4, 6 |
| 6 | $<x_6,y_6,z_6>$ | 1, 2, 3, 4, 5 |

Case 2 with 4 lights and one error

*Constructed Position Table*

| ID | Coordinates | Neighbor Set |
|---|---|---|
| 3 | $<x_3,y_3,z_3>$ | 1, 2, 4, 5, 6 |
| 4 | $<x_4,y_4,z_4>$ | 1, 2, 3, 5, 6 |
| 9 | $<x_9,y_9,z_9>$ | 8, 10 |
| 6 | $<x_6,y_6,z_6>$ | 1, 2, 3, 4, 5 |

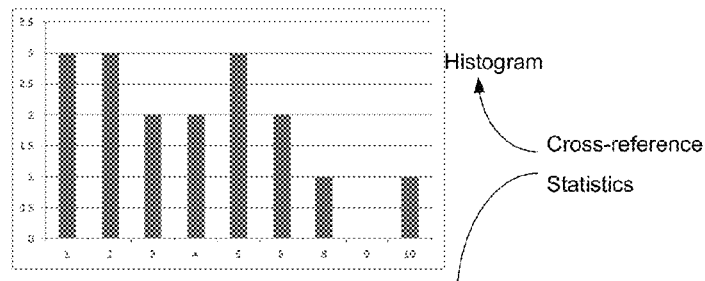

Histogram — Cross-reference — Statistics $k=4; L=5; j=L+1=6; m=j-k=2; n=p-m=1; \min<=n-1=0$

*Action: IDs #1, #2 and #5 belong to the set. ID#9 does not. To find out which ID is present, a request is made of the locations of ID#1, ID#2, and ID5.*

*Subsequently Retrieved Info.*

| ID | Coordinates | Neighbor Set |
|---|---|---|
| 1 | $<x_1,y_1,z_1>$ | 2, 3, 4, 5, 6 |
| 2 | $<x_2,y_2,z_2>$ | 1, 3, 4, 5, 6 |
| 5 | $<x_5,y_5,z_5>$ | 1, 2, 3, 4, 6 |

*Action: The image has one unidentified light. We calculate the Euclidean distance from ID#1, ID#2 and ID#5 to the estimated unidentified light position to determine the ID of the one light in question*

EXAMPLE 11

FIG. 16K

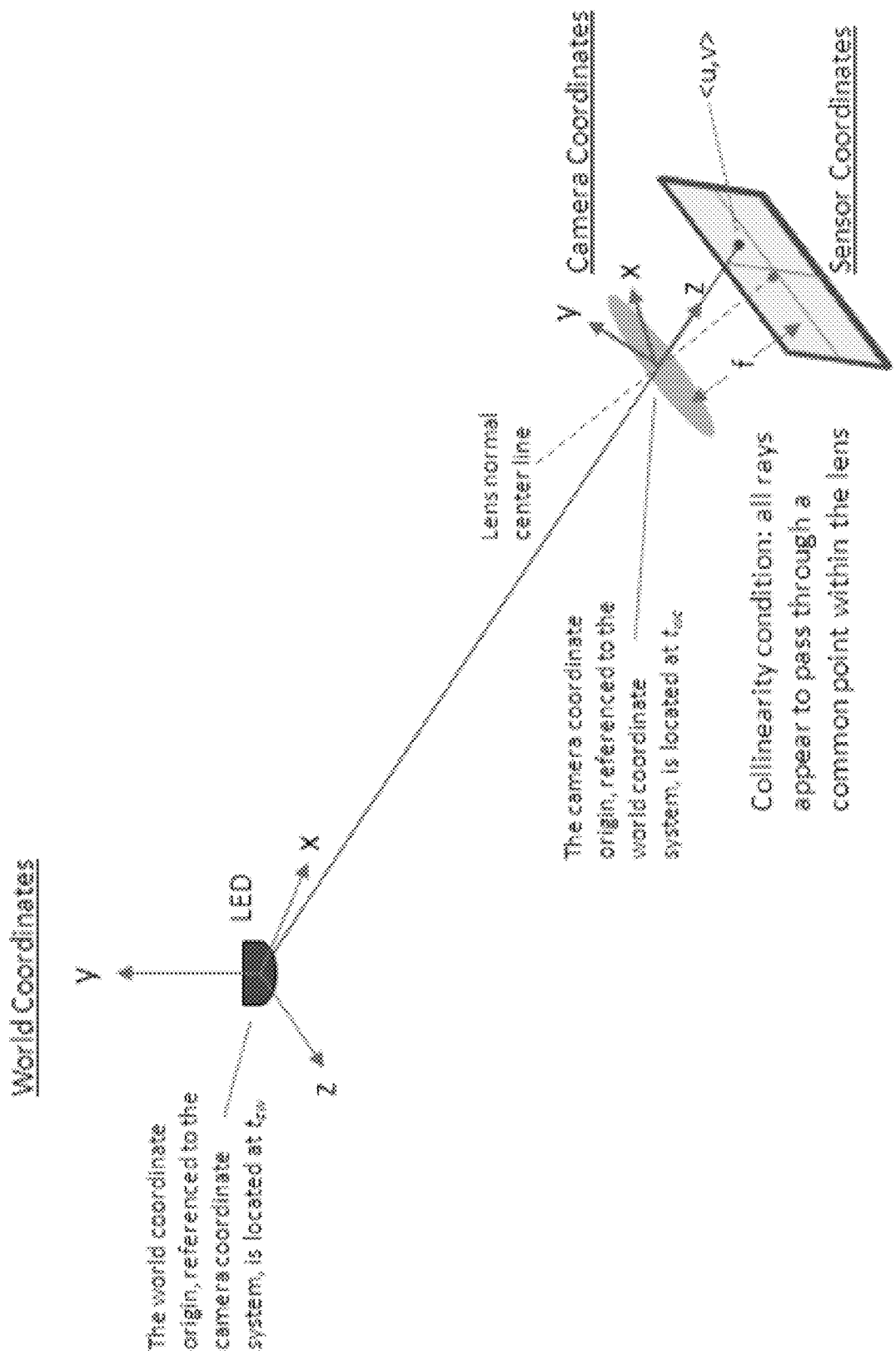

LIGHT ID ERROR DETECTION AND CORRECTION FOR LIGHT RECEIVER POSITION DETERMINATION

BACKGROUND

With the advent of cheap, bright light emitting diodes (LEDs), LED light arrays may be deployed as overhead lights in buildings, such as stores. LED light arrays have the capability to provide adequate area lighting, while being intensity modulated to communicate information, such as shopping information and the like, in a manner that is virtually imperceptible to humans. Conventional smartphones with built-in cameras provide Internet browsing and offer shopper friendly applications, such as global positioning system (GPS) store locator services. However, such applications fall short when it comes to guiding shoppers inside large superstores, for example, because GPS coverage may be lost indoors. While smartphones can capture pictures and videos, the smartphones are limited in their ability to process modulated light from overhead LED light arrays in a manner that supports intelligent applications, such as indoor position determination and guidance that may augment GPS positioning.

BRIEF DESCRIPTION OF THE DRAWINGS/FIGURES

FIG. 11 is a flowchart of an example method summarizing implicit photogrammetric position determination of a light receiver relative to a light transmitter.

Figure 14A:
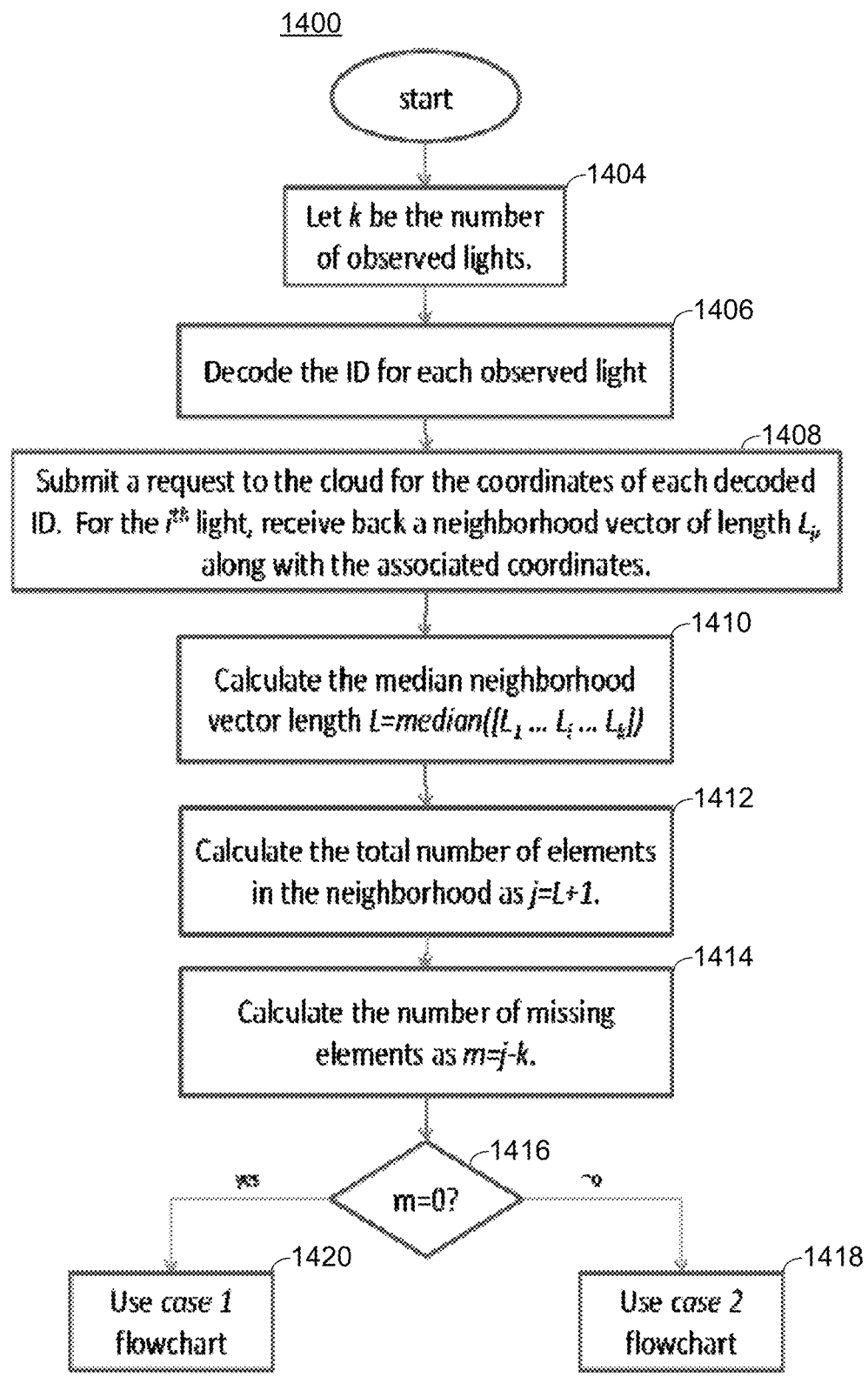
Figure 14B:
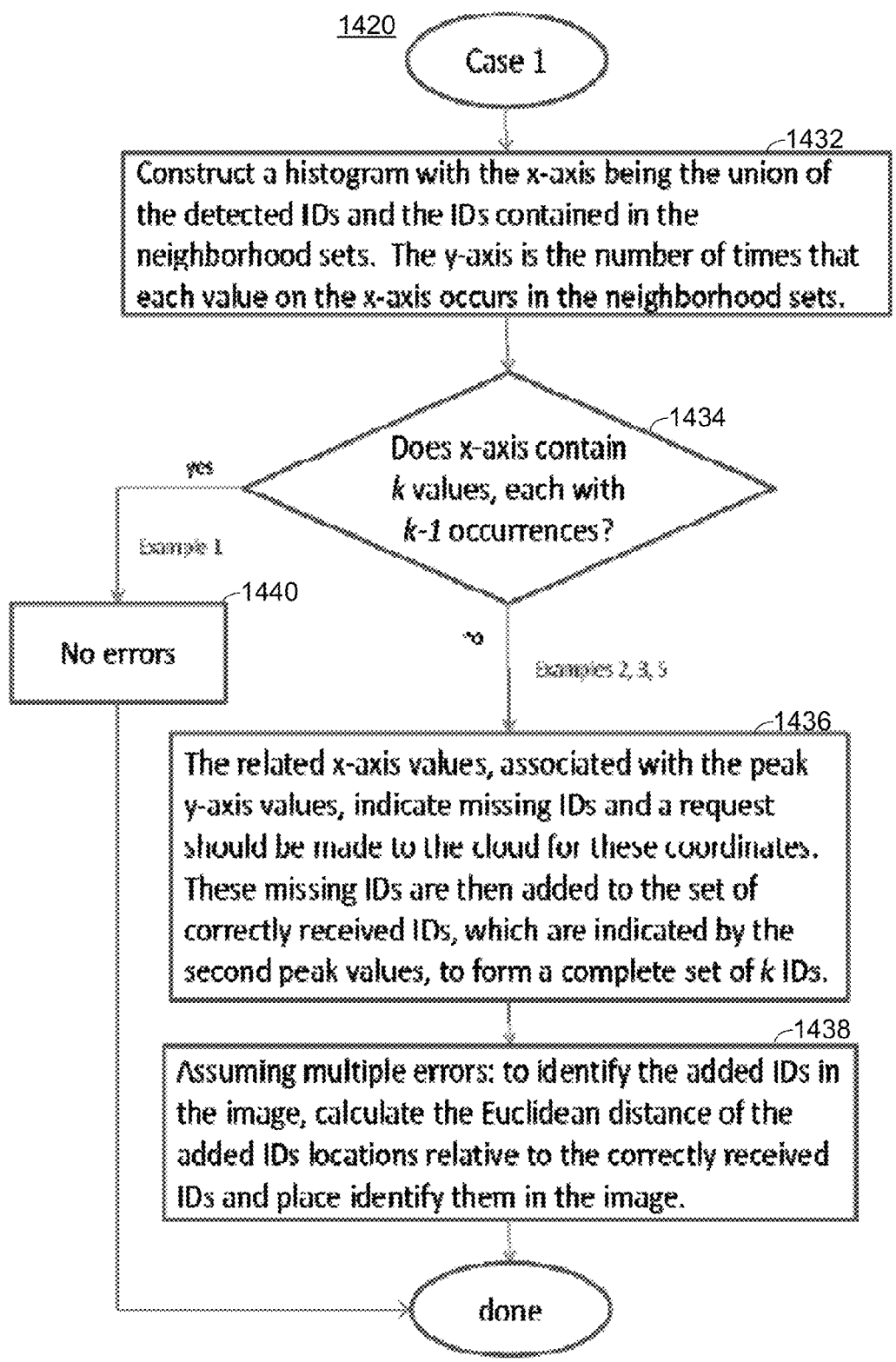
Figure 14C:
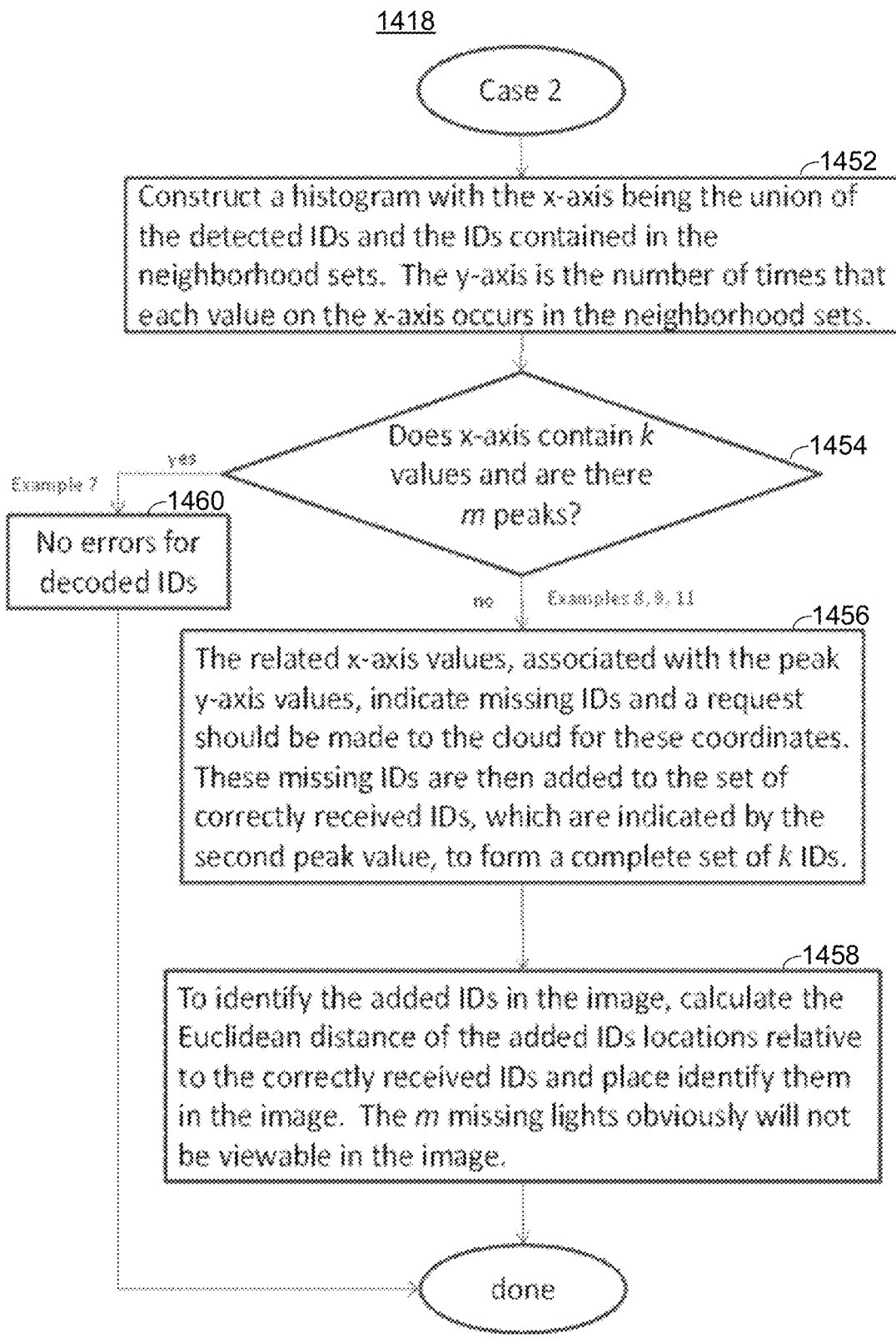

FIGS. 14A, 14B, and 14C are connected flowcharts that collectively summarize an example generalized method of light identifier (ID) error detection and correction.

Figure 15:
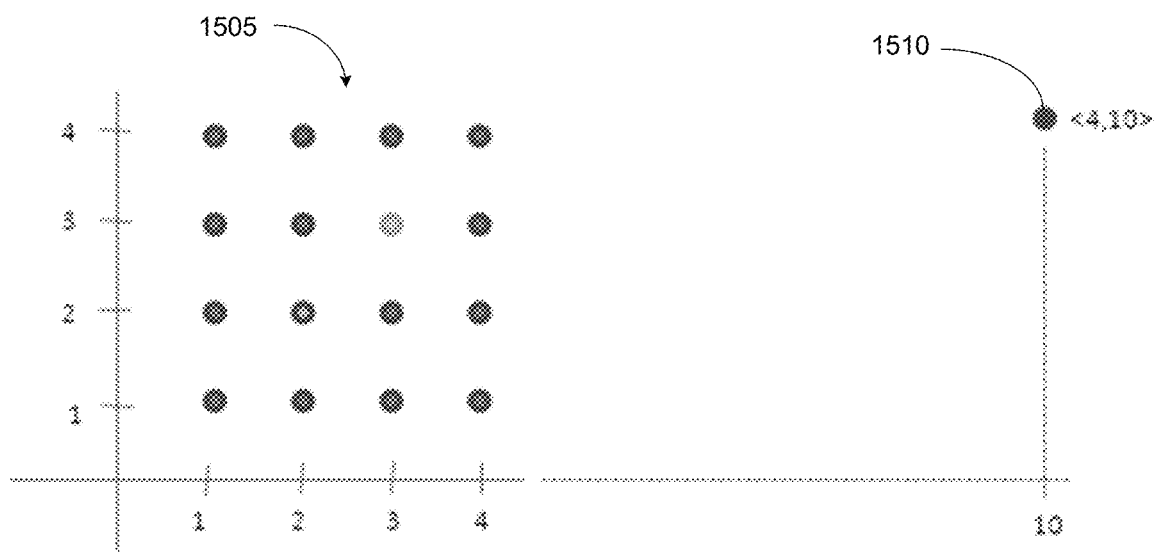
Figure 16A:
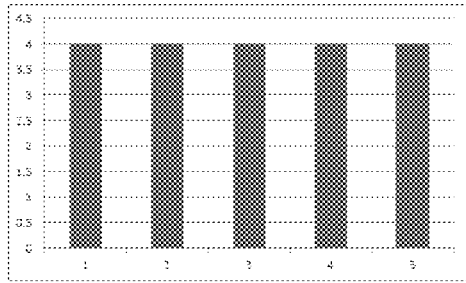
Figure 16B:
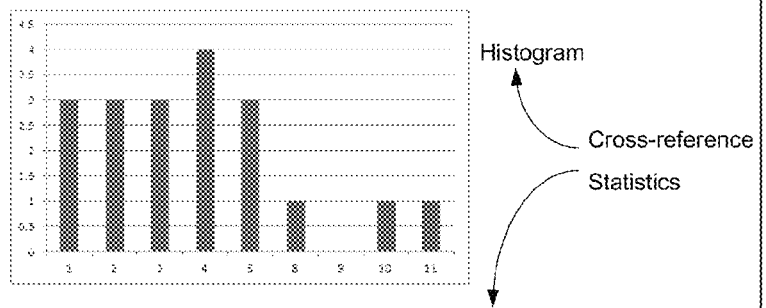
Figure 16D:
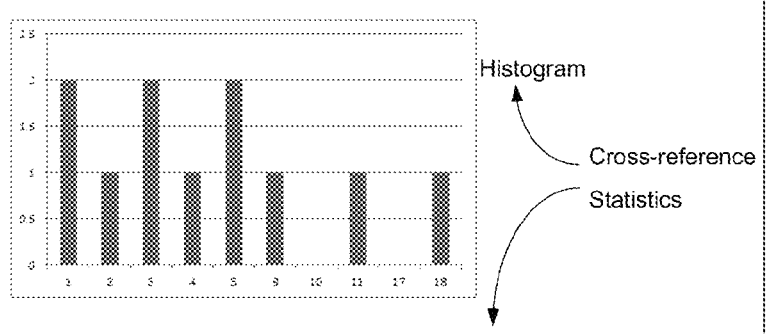
Figure 16E:
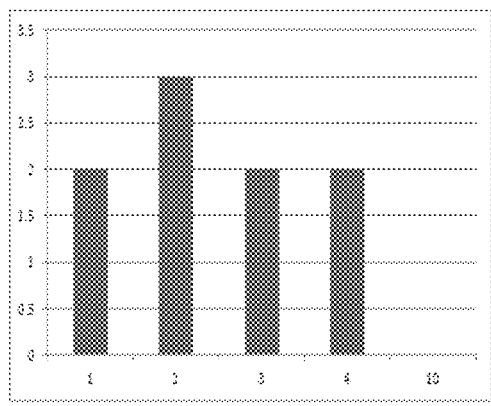
Figure 16F:
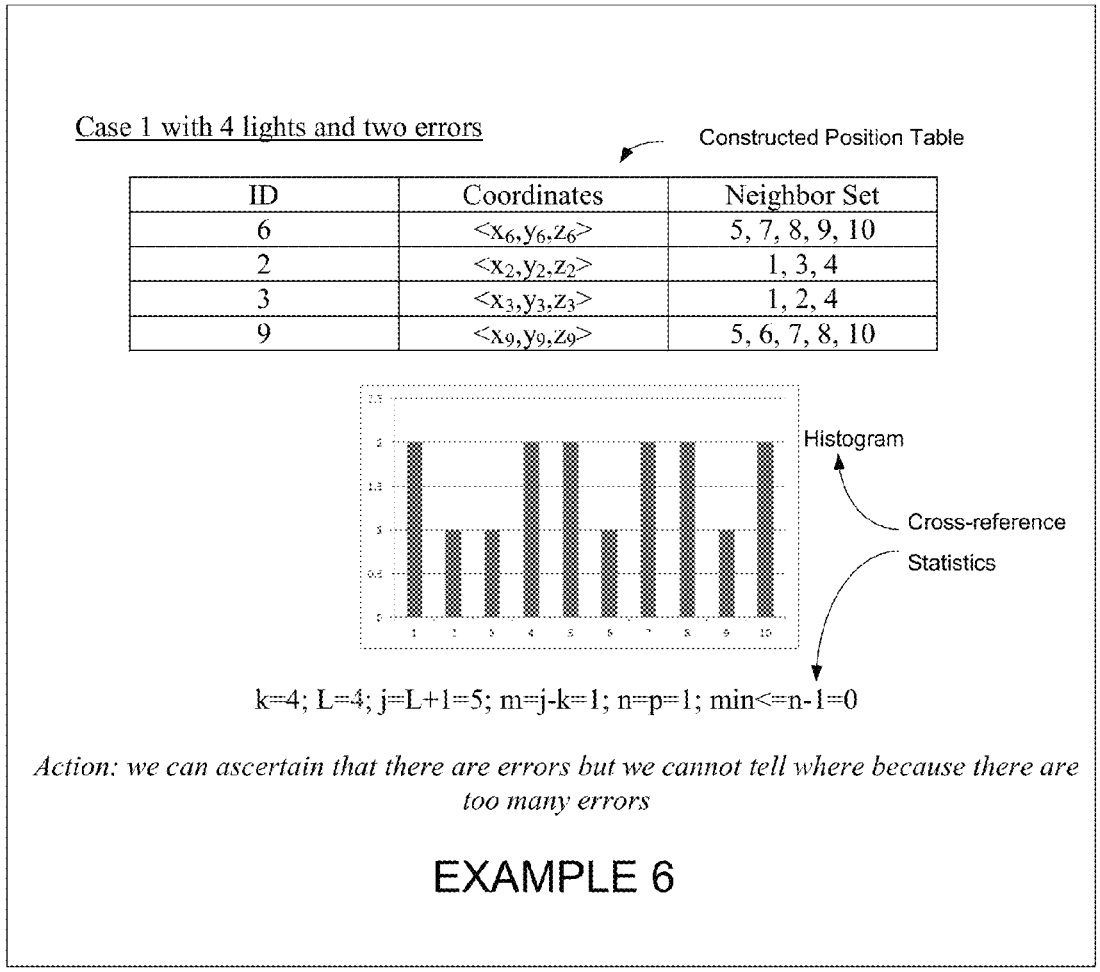
Figure 16I:
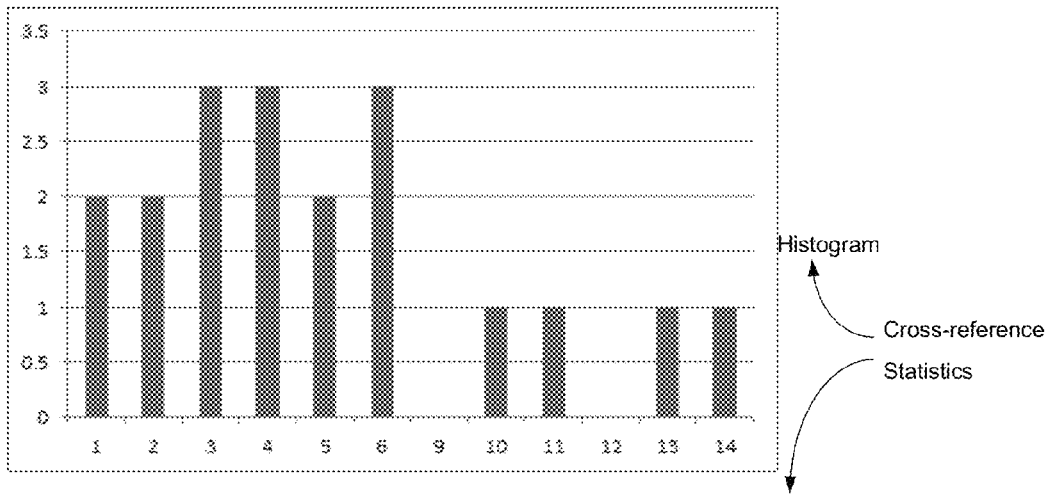
Figure 16J:
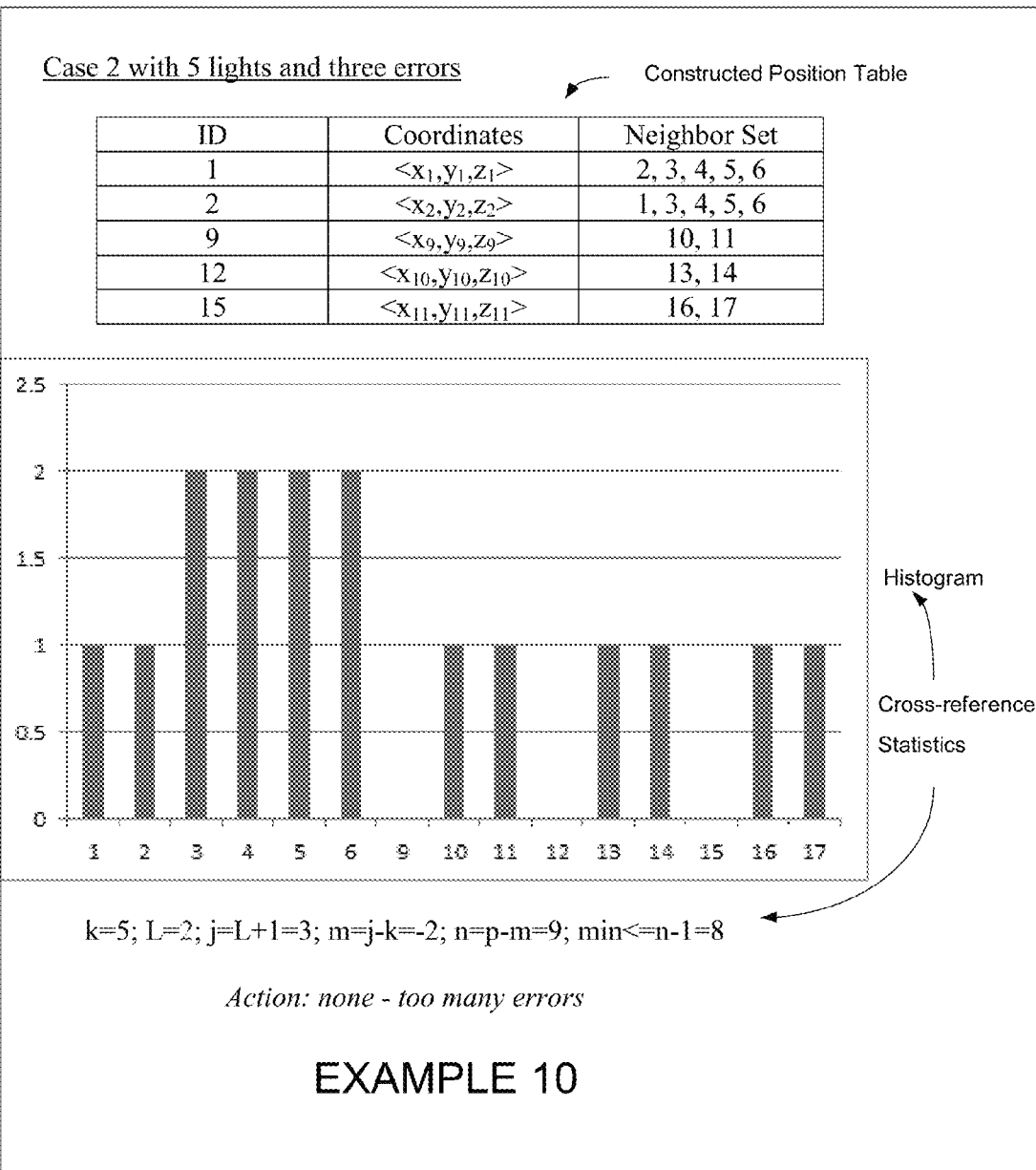

FIG. 15 is an illustration of an example set of neighborhood lights in which a missing light ID, determined using error detection and correction may be assigned to an image position based on Euclidean distances.

FIGS. 16A-16K represent illustrative Examples 1-11 respectively of light ID error detection and correction.

Figure 17:
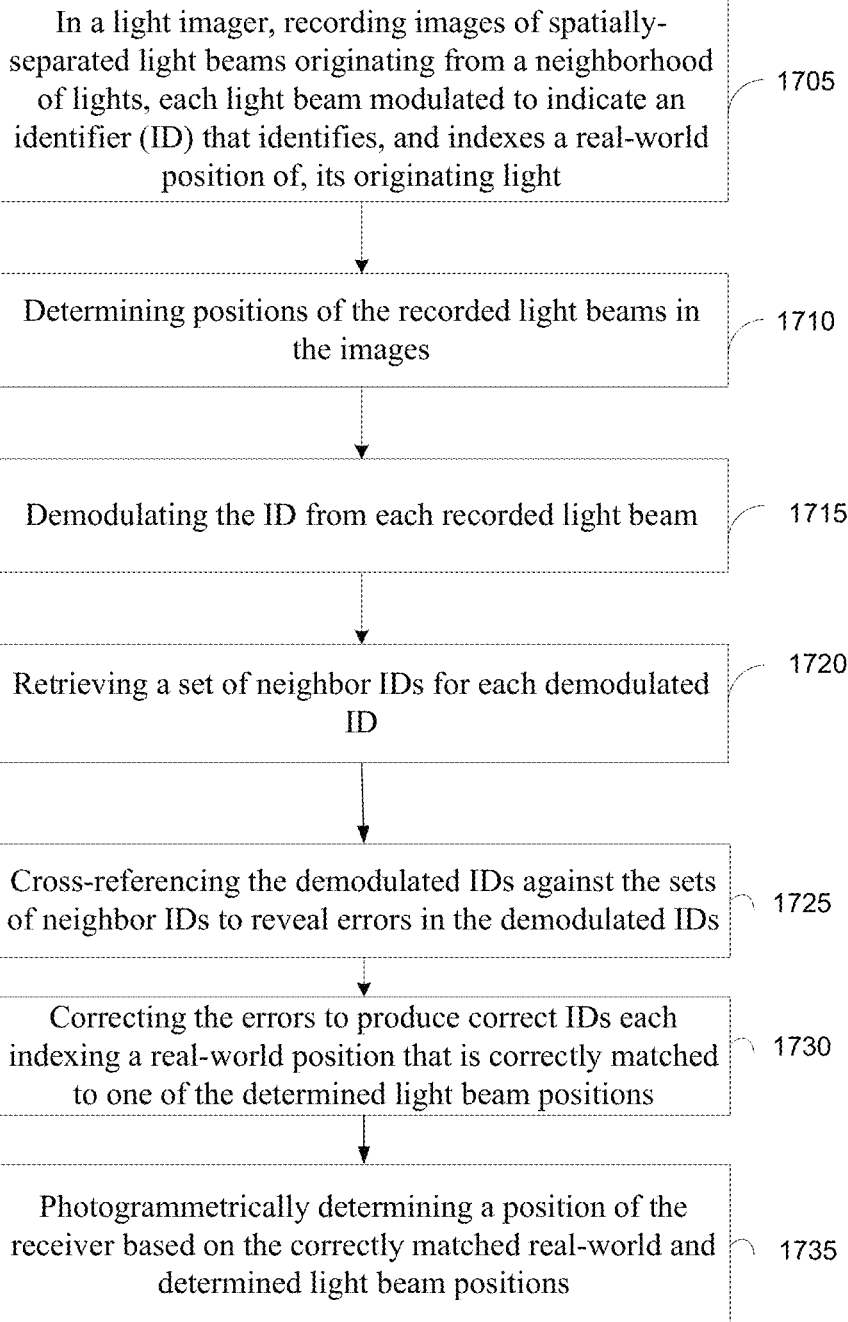

FIG. 17 is a flowchart of an example summary method of light ID error detection and correction.

Figure 18:
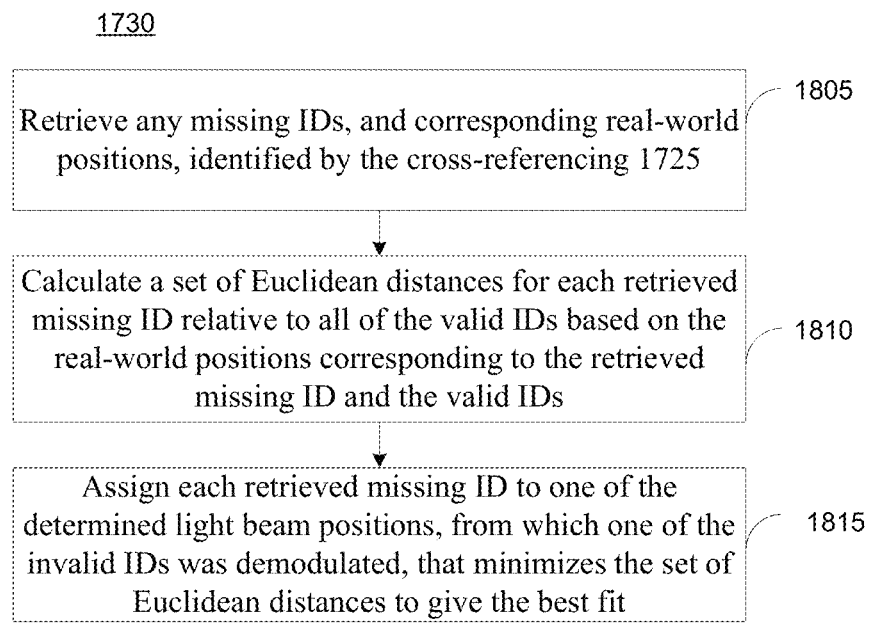

FIG. 18 is a flowchart of an example method expanding on the error correcting in the flowchart from FIG. 17.

Figure 19:
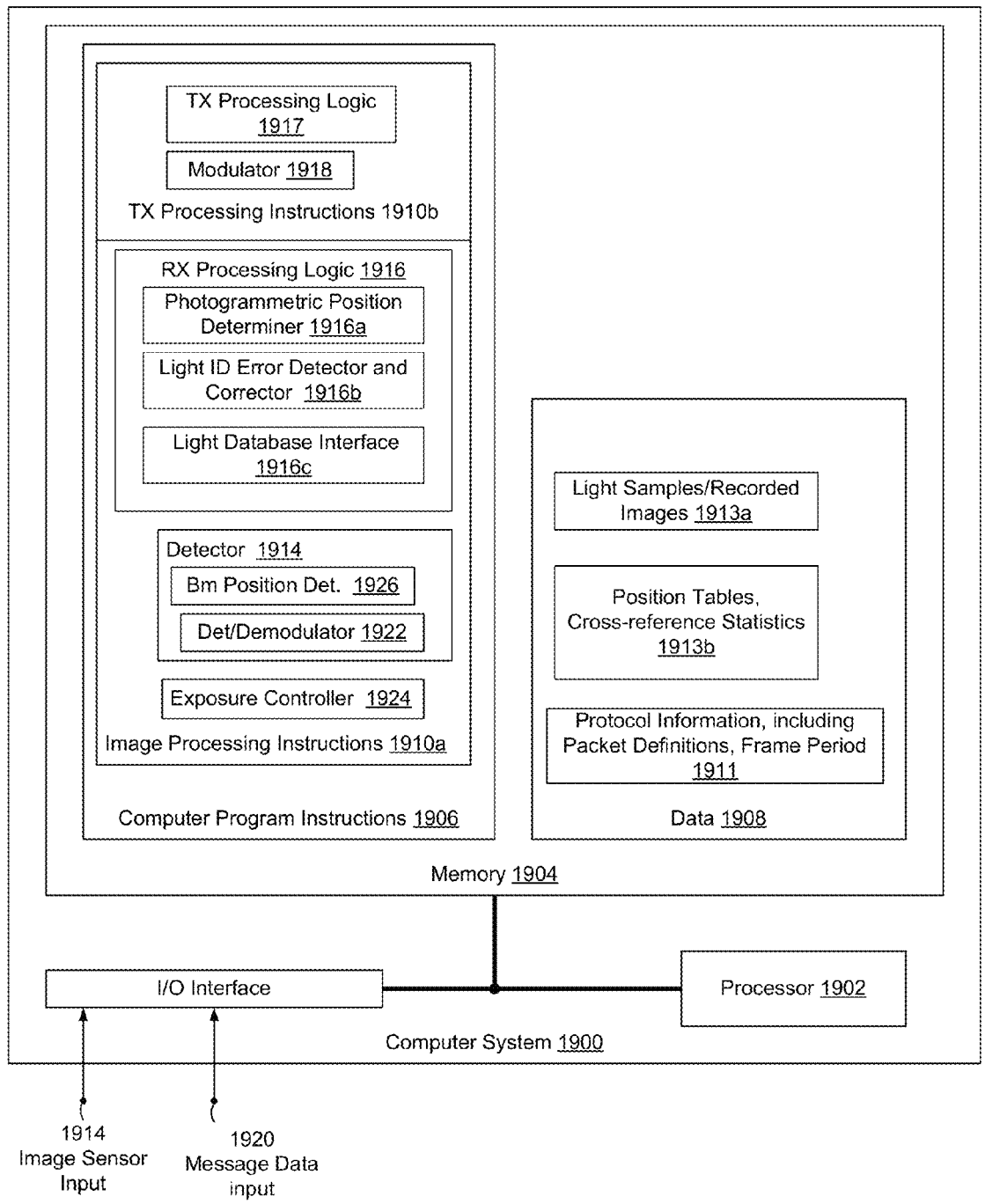

FIG. 19 is a block diagram of an example computer processor system configured to perform embodiments in accordance with examples described herein.

Figure 20:
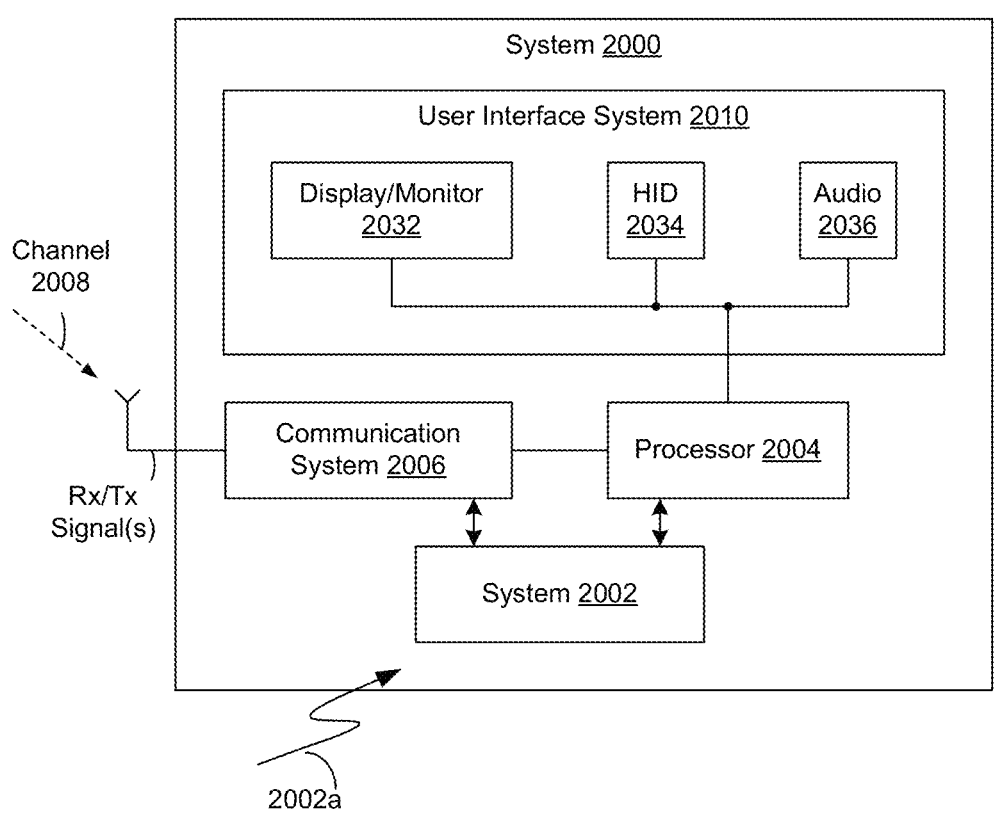

FIG. 20 is a block diagram of an example system to perform embodiments as described in one or more examples above.

FIG. 21 is an illustration helpful in describing the principle of photogrammetric positioning, In the drawings, the leftmost digit(s) of a reference number identifies the drawing in which the reference number first appears.

DETAILED DESCRIPTION

Described below are embodiments directed to light identifier (ID) error detection and correction used in photogrammetric position determination of a light receiver relative to a light transmitter. The light ID error detection and corrections embodiments are described most specifically in connection with FIGS. 12-18, and 21. The light transmitter includes an array of lights (i.e., a light array) that comprise a predetermined neighborhood of lights. The lights each transmit a light beam modulated to convey a unique light ID. Each ID identifies/represents, and indexes a real-world position of, its originating light in the neighborhood of lights.

A light receiver, such as a smartphone equipped with a camera, records images of the light beams originating from the neighborhood of lights. The receiver determines positions of the recorded light beams in the images, and demodulates an ID from each of the recorded light beams at its determined image position. The light receiver retrieves (i) a set of neighbor IDs for each demodulated ID, i.e., a list of the neighboring lights in the neighborhood of lights, and (ii) a real-world position of the light corresponding to the demodulated ID.

The light receiver cross-references the demodulated IDs against the retrieved sets of neighbor IDs to generate statistics that reveal valid demodulated IDs, and any errors in the demodulated IDs, including invalid demodulated IDs, and missing IDs, if any. The light receiver corrects the errors to produce correct IDs each indexing a real-world position that is correctly matched to one of the determined light beam positions. The light receiver may use Euclidean distance calculations to facilitate correction of the errors. Then the light receiver photogrammetrically determines a position of the receiver relative to the light transmitter based on the correctly matched real-world and determined light beam positions.

Figure 1A:
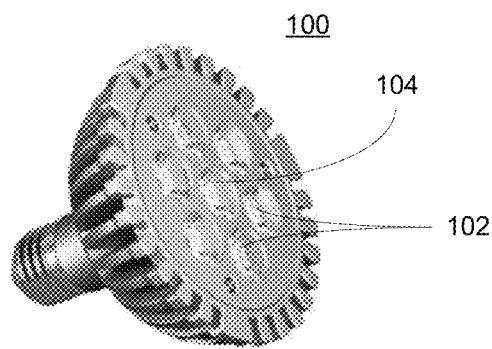
FIG. 1A is an illustration of an example light array, which may operate in accordance with embodiments described herein.

The ensuing description is divided into the following sections:

Light Arrays
Light Beam Diagram
Light Communication System Using FSOOK
   Light Transmitter
   Light Receiver and UFSOOK
Multi-light Transmitter
Implicit Photogrammetric Position Determination
   Flowchart
Light ID Error Detection and Correction
   Light Neighborhoods
      Conceptual Approach based on Light Neighborhoods
      Set Notation to Describe Light Neighborhoods
      Generalized Treatment
      Calculating Euclidean Distance
      Illustrative Examples
      Summary Flowcharts
Computer Processor System
Wireless Communication Receiver System
General Treatment of Photogrammetric Positioning
Computer Program, Apparatus, and Method Embodiments
Light Arrays FIG. 1A is an illustration of an example light array 100, which may operate according to embodiments described herein. Light array 100 includes LEDs 102 that are spatially-separated from each other in 2-dimensions, but clustered closely together around a center LED 104.

Figure 1B:
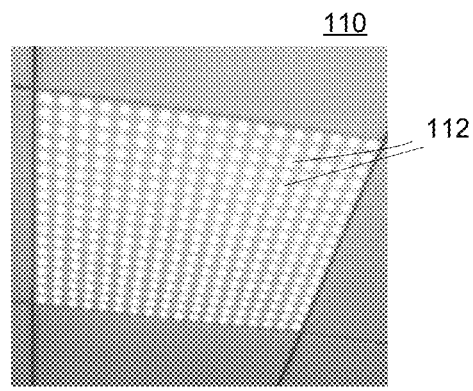
FIG. 1B is an illustration of another example light array, which may operate in accordance with the embodiments described herein.

FIG. 1B is an illustration of an example light array 110, which may operate according to embodiments described herein. Array 110 includes a rectangular array of LEDs 112 that are spatially-separated so as to be relatively far apart from each other compared to lights 102 of array 100.

Figure 1C:
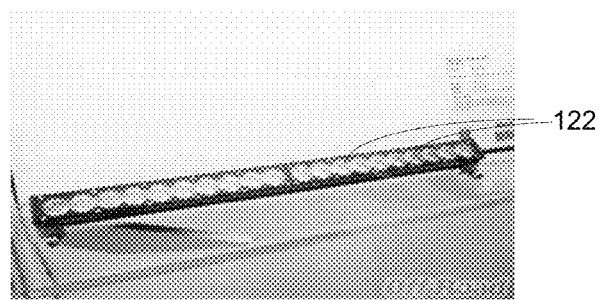
FIG. 1C is an illustration of yet another example light array, which may operate in accordance with the embodiments described herein.

FIG. 1C is an illustration of an example light array 120, which may operate according to embodiments described herein. Array 110 includes a linear array, or line bar, of LEDs 122.

Light Beam Diagram

Figure 2:
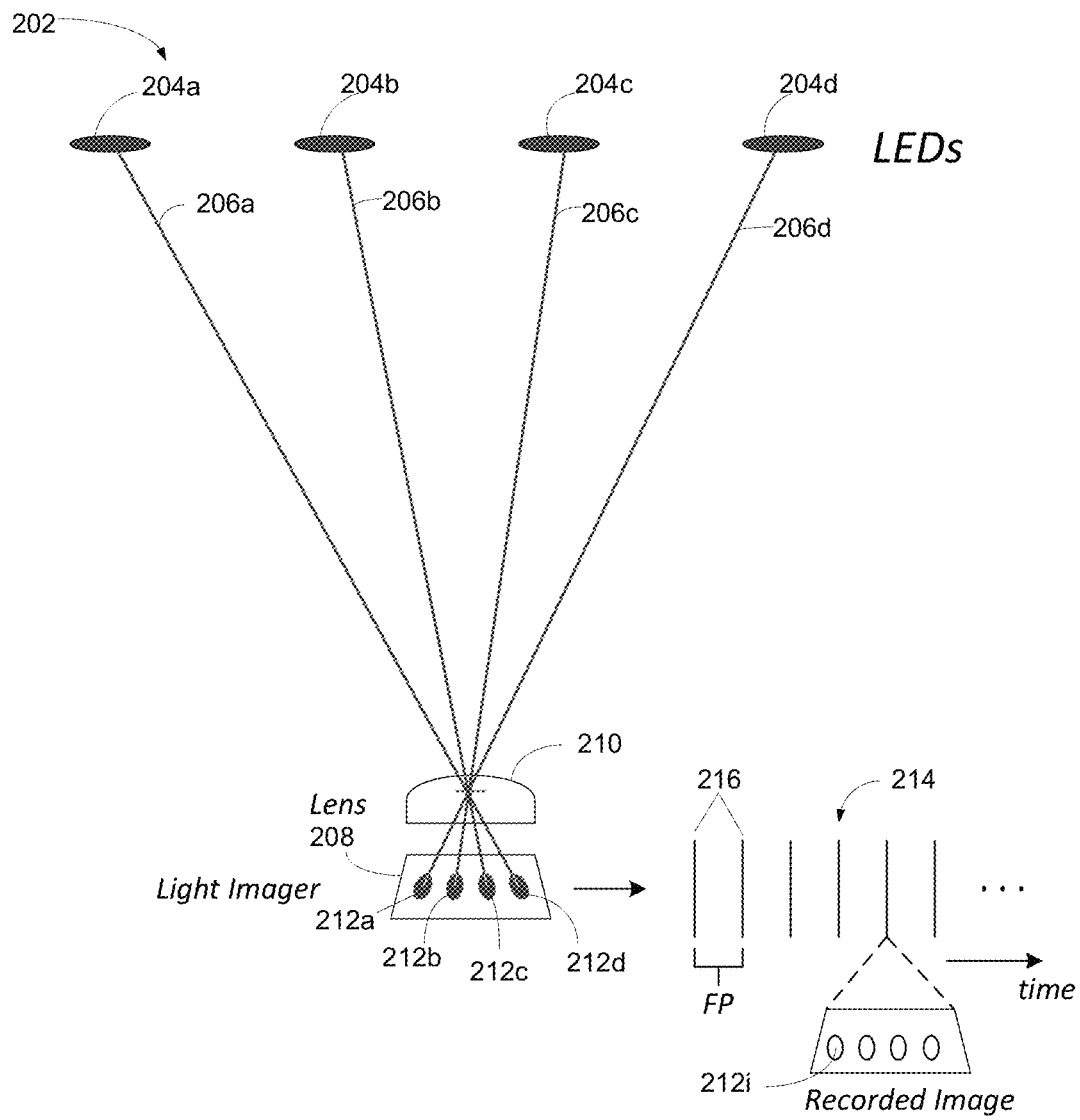
FIG. 2 is a diagram of an example light communication system employing spatially-separated beams.

FIG. 2 is a diagram of an example light array 202 that may operate in accordance with embodiments described herein. FIG. 2 introduces concepts helpful to understanding the embodiments described later. Light array 202 may be configured similarly to any of light arrays 100, 110, and 120, or any other light array including spatially-separated lights. Array 202 includes lights 204a-204d implemented to transmit simultaneously a respective one of free-space optical light beams 206a-206d to a multi-dimensional or planar light imager/sensor 208, through an imaging lens 210. The terms "light beam" and "light" are use equivalently and interchangeably throughout the ensuing description.

Light imager 208 may include a multi-dimensional charge coupled device (CCD) array including many sensor pixels or light detectors, as is known in the art. Light beams 206a-206d are sufficiently spatially-separated from one another as to form corresponding beam images 212a-212d, or light spots, on spatially-separated areas of light imager 208. Each of light spots/areas 212i occupies a position, e.g., an x-y position on a light sensor plane of the light imager, corresponding to a cluster of sensor pixels. Over time, light imager 208 repetitively captures or records, simultaneous light beams 206i impinging on areas 212i, to produce a time-ordered sequence 214 of recorded images 216 of light array 202.

Light imager 208 captures the images at a predetermined frame rate of, e.g., approximately 30 frames/second, i.e., every 1/30 seconds. Therefore, sequential images 216 are spaced in time by a frame period equal to an inverse of the frame rate. Sequential images 216 may be processed in accordance with methods described herein.

Light Communication System Using FSOOK

Figure 3A:
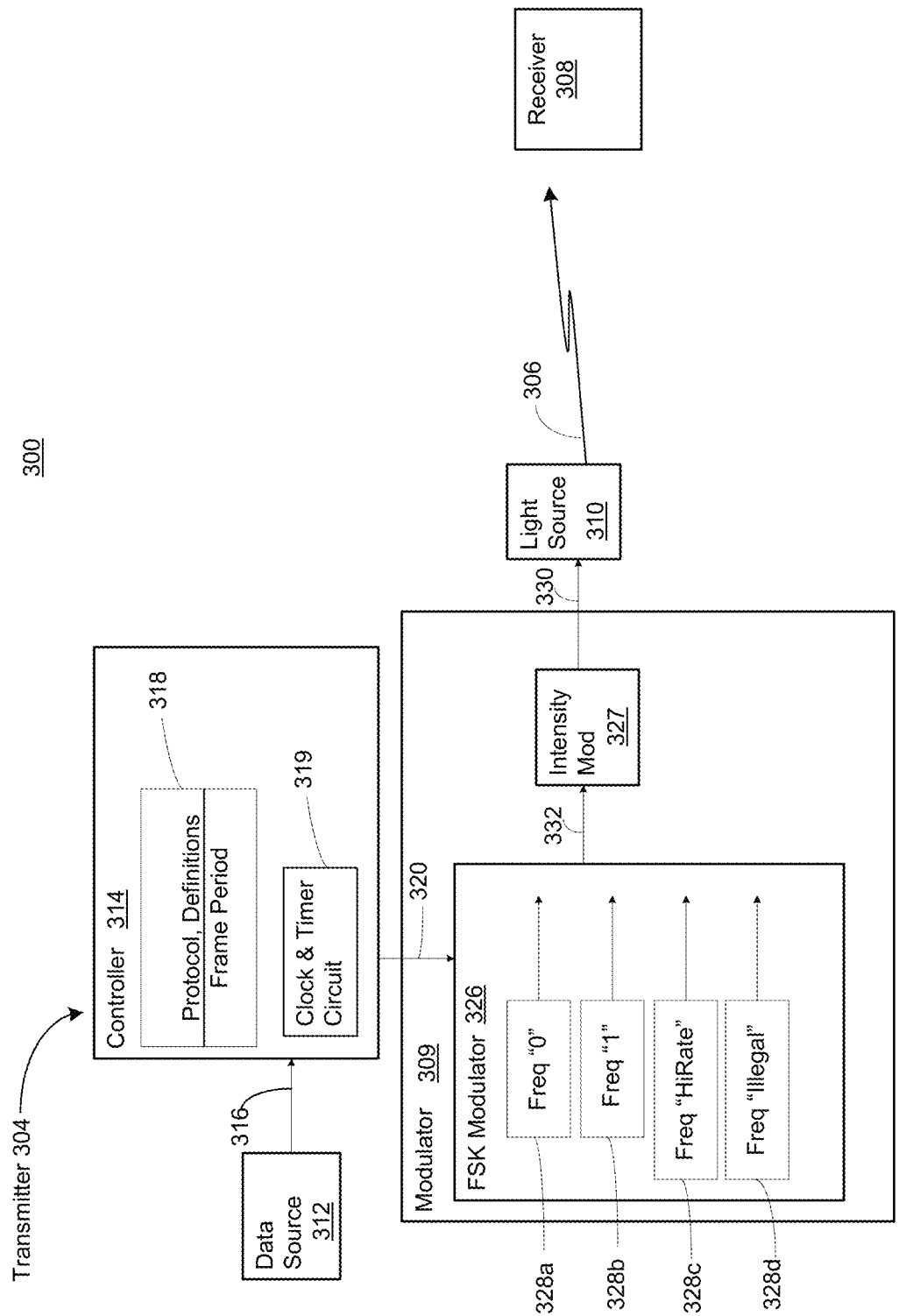
FIG. 3A is a block diagram of an example light communication system and an example light transmitter useful to introduce the principles of frequency shift on-off keying (FSOOK) modulation and detection/demodulation, as it applies to the embodiments described herein.

FIG. 3A is a block diagram of an example light communication system 300 useful to introduce the principles of FSOOK modulation and detection/demodulation. System 300 includes a light transmitter 304 to transmit a FSOOK modulated light beam 306 comprising modulated light packets to a light receiver 308, which detects and demodulates the received light. The FSOOK modulated light beam conveys modulated light packets formatted according to protocol light packet definitions.

Light Transmitter

Light transmitter 304 includes a light modulator 309 to intensity modulate a light source 310, a data source 312, and a controller 314 to control the transmitter. Data source 312 provides data 316, such as a message in the form of data bits, to controller 314. Controller 314 includes a memory 318 to store protocol control logic, protocol light packet definitions, and a frame rate $F_{fps}$ in frames per second, which is equal to the inverse of a frame period $T_{frame}$ in seconds (i.e., $F_{fps}=1/T_{frame}$). The frame rate $F_{fps}$ is an anticipated rate at which light receiver 308 will sample received light, as will be described more fully below in connection with FIG. 3B.

Controller 314 also includes a clock and timer module 319 to generate a master timing signal, and derive from the master timing signal timing outputs used by controller 314 to control transmit light packet start times and durations based on the master timing signal. Based on data 316, the contents of memory 318, and the timing outputs from clock and timer module 319, controller 314 generates commands 320 to cause modulator 309 to modulate light source 310 in accordance with examples described herein.

Modulator 309 includes an FSK modulator 326 and an intensity modulator 327 that together generate a modulation signal 330 to FSOOK modulate light source 310. Controller commands 320 include commands that specify (i) a selected frequency at which FSK modulator is to operate, (ii) a start time at which FSK modulator 326 is to begin generating and outputting the selected frequency, and (iii) a duration (or time period) over which the selected frequency is to be generated. The start time and duration may be graduated in fractions of time period $T_{frame}$, such as 1/1000 of $T_{frame}$. In response to controller commands 320, FSK modulator 326 outputs the selected frequency as an FSK signal 332 beginning at the specified time and duration, such as for an integer number of frame periods, which facilitates detection and demodulation of the frequency at receiver 308. The selected frequencies may include:

a first frequency 328a F0 (e.g., 120 Hz) indicative of a logic 0 of a data bit 316 to be transmitted;

a second frequency 328b F1 (e.g., 105 Hz) indicative of a logic 1 of the data bit to be transmitted;

a third frequency 328c "HiRate" indicative of a first start-frame-delimiter to be transmitted. The HiRate frequency is orders of magnitude greater than frequencies F0, F1, e.g., many KHz or above. An exemplary HiRate frequency is 25 KHz; and a fourth frequency 328d "Illegal" (e.g., 112.5 Hz, i.e., half-way between frequencies F0, F1) indicative of a second start frame delimiter to be transmitted.

FSK modulator 326 may include a voltage, or digitally, controlled oscillator that generates the above frequency responsive to commands 320. The terms "tone" or "tones" and "frequency" or "frequencies" are used equivalently and interchangeably herein.

Figure 4A:
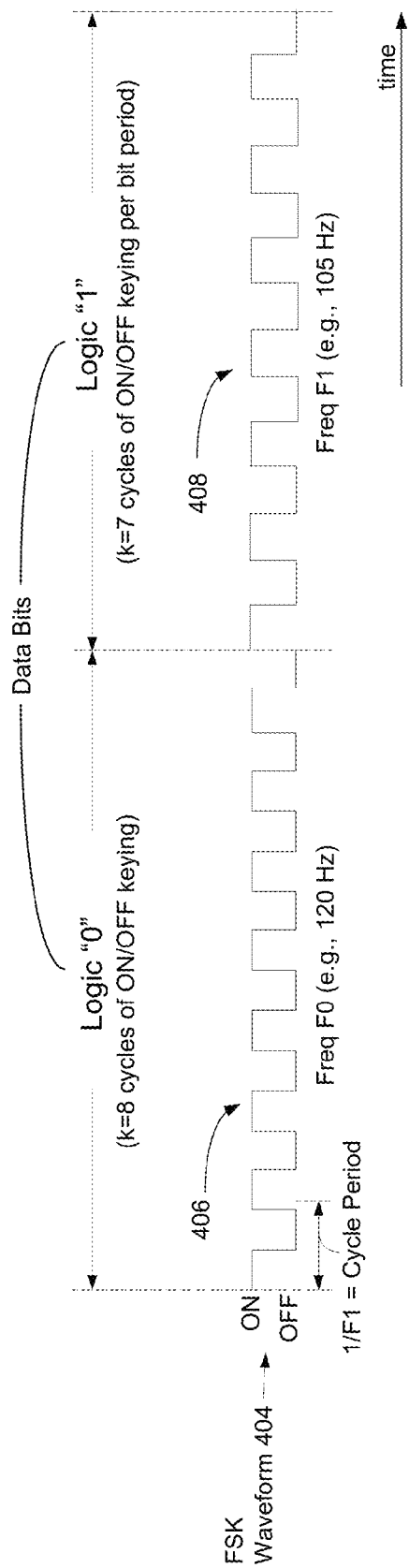
FIG. 4A is an illustration of an example timing diagram of a frequency shift keying (FSK) waveform corresponding to an FSK signal from FIG. 3A.

FSK modulator 326 may generate each of the frequencies F0, F1, HiRate, and Illegal of FSK signal 332 as a substantially rectangular, or ON-OFF keying, waveform, where ON represents a logic 1 of the FSK waveform, and OFF represents a logic 0 of the FSK waveform. Also, to transmit a data bit, each of frequencies F0 and F1 may extend over multiple frame periods, and may be harmonically related to the frame period such that an integer number, k, of ½ cycles or periods of the rectangular FSK waveform matches the frame period, as is depicted in FIG. 4A (described below). More generally:

representing a logic 0, frequency $F0=N \times F_{fps}$; and
representing a logic 1, frequency $F1=N \pm 0.5F_{fps}$, where N is an integer.

Each of the frequencies F0, F1, HiRate, and Illegal, together with the respective number of frames over which they are transmitted, form a light protocol. More specifically, transmitter 304 combines these parameters into the above mentioned modulated light packets formatted in accordance with the light protocol, and then transmits the light packets.

FIG. 4A is an illustration of an example timing diagram of an FSK waveform 404 corresponding to FSK signal 332 in FIG. 3A, where the frame rate $F_{fps}$ is 30 Hz, the bit rate is half the frame rate, i.e., the bit rate is ½ $F_{fps}=15$ bits-per-second, and N=4. Therefore, each data bit has a duration that is two frames periods, i.e., $2 \times T_{frame}$. Therefore, to transmit two consecutive data bits, e.g., a logic 0 followed by a logic 1, controller commands 320 cause FSK modulator 326 to generate first an ON-OFF keying waveform 406 at frequency F0 (e.g., 120 Hz=4×30 Hz) for a time period of two frames to represent the logic 0 data bit, and then an ON-OFF keying waveform 408 at frequency F1 (e.g., 105 Hz=3.5×30 Hz) for a period of two frames to represent the logic 1 data bit. The harmonic relationship between frequencies F0 and F1 and the period of two frames is such that (i) waveform 406 at frequency F0 includes eight full cycles, i.e., k=8, during the data bit period, and (ii) waveform 408 at frequency F1 includes seven full cycles or periods, i.e., k=7, during the second data bit period. In other words, over a bit period, eight cycles of FSK signal 332 represent a logic 0, while seven cycles represent a logic 1.

Intensity modulator 327 intensity modulates light source 310 based on the modulation signal 330, to produce modulated light beam 306. Light source 310 may be an LED that emits light in any of the visible, infrared, or ultraviolet light spectrums. In an embodiment, modulation signal 330 follows the shape of FSK signal 332 and adjusts a current through light source 310 to proportionally adjust an intensity of light 306 emitted by the light source. In this manner, ON-OFF keying of modulation signal 330 causes corresponding ON-OFF keying of the intensity of light 306, such that the intensity closely follows ON-OFF keying waveforms 404, 406 depicted in FIG. 4A. Other intensity modulation embodiments are possible, e.g., light source 310 may not be turned off completely during the OFF cycle of the FSK waveform, and so on. For example, a reduced light intensity (e.g., ½ of maximum intensity) from light source 310 may serve as an alternative for the HiRate frequency. Applying a reduced steady state drive current to the light source 310 will cause the light intensity emitted by the light to be correspondingly reduced. Because other such intensity levels are possible, e.g., light source 310 may not be turned off completely, the intensity levels ON, OFF are more generally represented as intensity levels HIGH, LOW.

Transmitter 304 is depicted with one light 310 for simplicity only. Other embodiments include many lights each driven by a corresponding light modulator, as will be described later in connection with FIG. 6.

Transmit Light Packet Definition

Figure 4B:
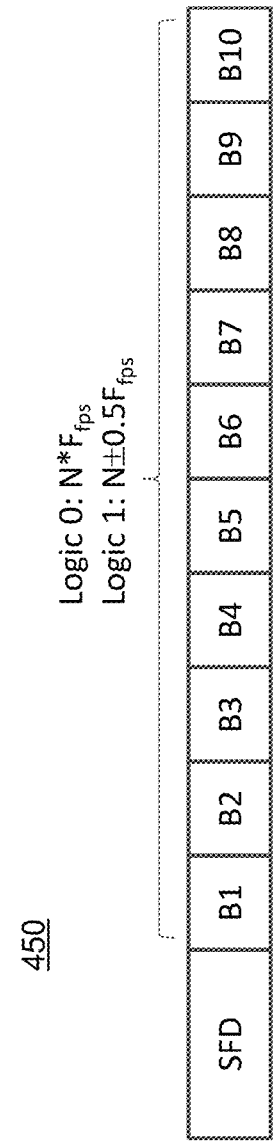
FIG. 4B is an illustration of an exemplary light packet definition or light packet protocol for light packets formatted and transmitted by the light transmitter of FIG. 3A.

FIG. 4B is an illustration of an exemplary light packet definition 450 or light packet protocol for light packets formatted and transmitted by light transmitter 304. According to light packet definition 450, each light packet includes sequential fields of light, beginning with the SFD, which includes light that is intensity modulated at one of the HiRate and Illegal frequencies for multiple, e.g., four, frame periods. Following the SFD, the light packet conveys a series of consecutive, contiguous message bits B1-B10, each of which may be either a logic 0 or a logic 1. Message bits B1-B10 are each conveyed as light that is intensity modulated at the corresponding FSK frequency F0 (for logic 0) or F1 (for logic 1) for two frame periods, i.e., light that is cyclically keyed to multiple intensity levels (e.g., ON, OFF, or HIGH, LOW) at the FSK frequency indicative of the appropriate bit level (i.e., logic 0 or logic 1).

Light Receiver

Figure 3B:
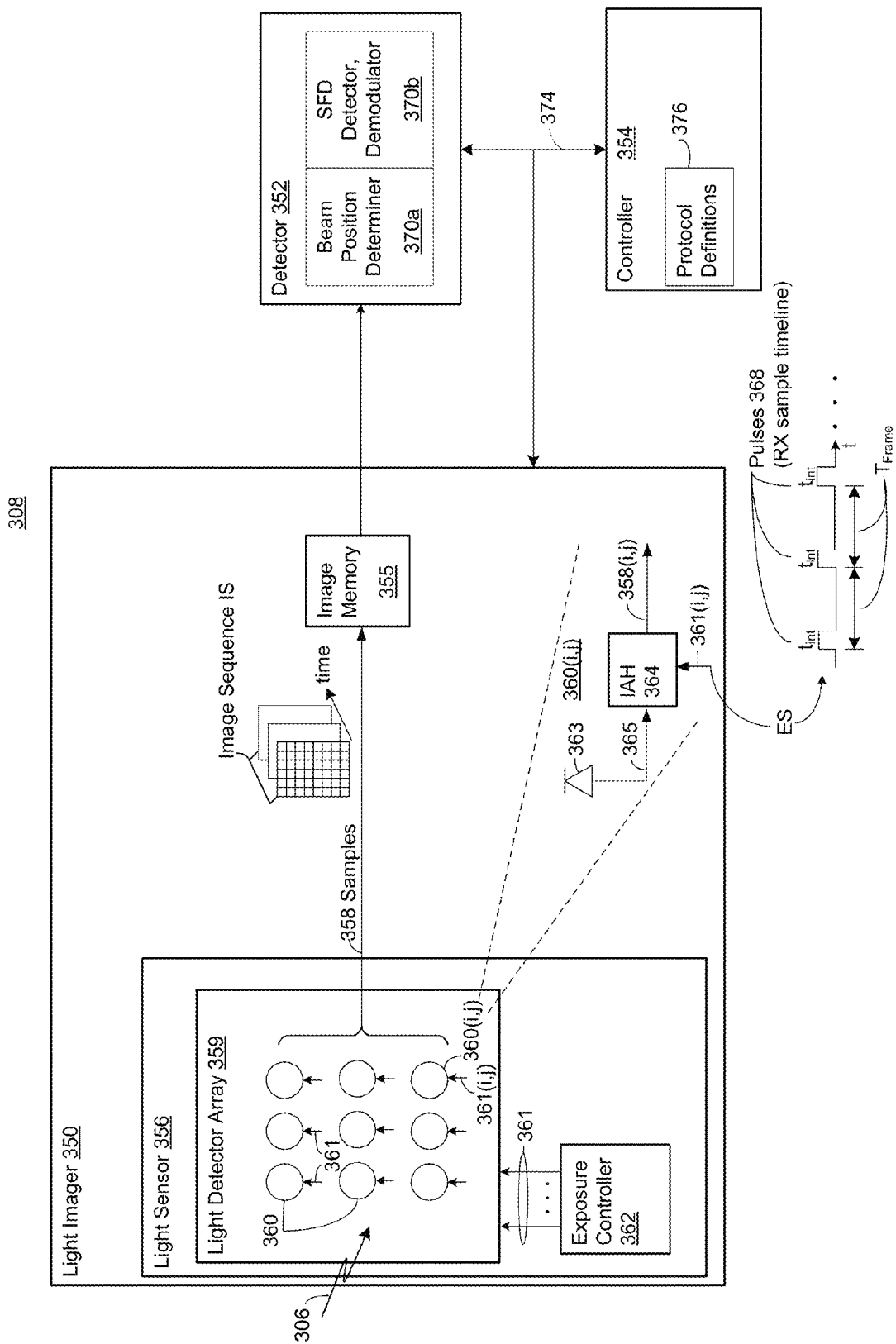
FIG. 3B is a block diagram of a light receiver from FIG. 3A, according to an embodiment.

FIG. 3B is a block diagram of light receiver 308, according to an embodiment. Light receiver 308 receives the modulated light packets conveyed in modulated light beam 306. In embodiments, light receiver 308 will receive many spatially-separated modulated light beams simultaneously. Light receiver 308 includes a light imager 350 (also referred to as an imager 350) to sample and record received modulated light packets in light beam 306 as images, a detector 352 to detect and demodulate the fields of modulated light in the light packets recorded in the images, and a controller 354 to control the receiver and process the recorded images as described in one or more examples herein.

Imager 350 includes a light sensor 356, e.g., including a 2-dimensional array of light detectors, that repetitively samples light impinging on the light sensor at a predetermined receive sample rate equal to the frame rate, $F_{fps}=1/T_{frame}$, of imager 350 to produce a signal 358. Signal 358 includes a time-ordered sequence of 1-dimensional, or alternatively, 2-dimensional light samples, which form images of an image sequence IS (similar to images 216 depicted in FIG. 2). In other words, the images are formed from the light samples. Accordingly, signal 358 is referred to in terms of both "light samples 358" and "images 358" interchangeable and equivalently. Imager 350 records images 358 in an image memory 355 of the imager.

Light Detector Array

Light sensor 356 may include a 2-dimensional light detector array 359, such as a CCD array, including multiple individual light detectors 360 (also referred to as sensor pixels 360) spatially arranged in M rows by N columns, where M and N may each be in the hundreds or thousands. For convenience, exemplary light detector array 359 is depicted in FIG. 3B as having only 3 rows by 3 columns of light detectors 360. Each of light detectors 360 receives a corresponding one of multiple enable signals 361 generated by an exposure controller 362 of light sensor 356. Enable signals 361 cause light detectors 360 to sample light in a controlled manner, to produce light samples 358 (forming the images), which may be digitized light samples, as will be described more fully below.

An exemplary individual light detector 360(i, j) is depicted in expanded view in FIG. 3B at the bottom right-hand side of the imager block 350. Descriptors (i, j) indicate the row (i) and column (j) positions in array 359, where i=1 . . . M, j=1 . . . N. Light detector 360(i, j) includes a photo-detector 363 followed by an integrate-and-hold (IAH) circuit 364. Photo-detector 363 converts light energy 306 impinging thereon into an electrical signal 365 having a magnitude that follows or represents the intensity of the light energy.

IAH circuit 364 operates as an approximated matched filter to recover samples of the FSK light waveform pulses, such as the pulses of waveforms 406, 408, in the light packets of light beam 306. IAH circuit 364 integrates electrical signal 365 for an integration time $t_{int}$ according to enable signal 361(i, j), to produce a peak integrated signal, also referred to herein as light sample 358(i, j) or sampled light 358(i, j), which is held at the output of the IAH circuit. The process of enabling light detector 360(i, j) to sample light 306 in accordance with enable signal 361(i, j), to produce light sample 358(i, j), is also referred to herein as "exposing light detector 360(i, j), to produce light sample 358(i, j)." Integration time $t_{int}$ may be approximately a half-period or less of the waveforms of frequencies F0, F1, so that light detector 360(i, j) approximately maximally samples light that is intensity modulated at frequencies F0, F1 of FSK waveforms 406, 408 (for logic levels 0, 1).

An exemplary enable signal waveform "ES" of enable signal 361(i, j) is depicted at the bottom of FIG. 3B. Enable signal 361(i, j) (e.g., waveform ES) may include a series of enable pulses 368 spaced in time from each other by frame period $T_{frame}$, i.e., the enable pulses have a pulse repetition rate equal to the frame rate $F_{fps}=1/T_{frame}$ of image sensor 356. Each of enable pulses 368 has a pulse width equal to $t_{int}$ to enable IAH circuit 364 to integrate energy over the pulse width, and hold peak integrated signal 358(i, j) at the output until a next pulse in the series of pulses causes the IAH to resample its input. Enable pulses 368 establish and represent a receive sample timeline of light receiver 308. In this way, light detector 360(i, j) samples light energy 306 impinging on position (i, j) of light detector array 359 at frame rate $F_{fps}$, to produce sampled light energy as a series of light samples represented at 358(i, j) coinciding with pulses 368. Each of light detectors 360 may simultaneously sample light energy 306, to produce simultaneous light samples 358(1-M, 1-N) represented in signal 358.

Global and Line Array Exposure Modes

Exposure controller 362 generates enable signals 361 in any number of ways to implement different exposure modes of light detector array 359, as is now described.

Exposure controller 362 may expose array 359 (i.e., enable light detectors 360 to sample light 306 in accordance with enable signals 361, to produce light samples 358) in either a global exposure mode or, alternatively, in a sequential line exposure mode. In the global exposure mode, exposure controller 362 generates enable signals 361 so that their respective series of enable pulses 368, i.e., respective integration periods $t_{int}$, coincide in time with each other, i.e., occur at the same time. The result is that all of light detectors 360 are exposed at the same time, i.e., they all sample light 306 at the same time, once every frame period $T_{frame}$, to produce a time-spaced sequence of 2-D images represented in images 358 (which represents all light samples 358(i, j), i=1 . . . M, j=1 . . . N), as represented in FIG. 3B by image sequence IS. Each image in the sequence of images IS includes a 2-D array of light samples corresponding to the 2-D array of light detectors 360.

In the line exposure mode, exposure controller 362 may generate enable signals 361 to expose spatially-successive lines, e.g., successive rows or successive columns, of light detectors 360 one after the other, e.g., one at a time, in a time sequence. For example, exposure controller 361 may generate enables signals 361 so as to expose:

all of light detectors 360 across row i−1 (i.e., all of the N light detectors 360(i−1, 1-N)) at a same time t−τ; then all of light detectors 360 across row i at a same time t; then all of light detectors 360 across row i+1 at a same time t+τ, and so on.

This produces spatially-successive lines of sampled light, spaced in time at sequential times t−τ, t, t+τ, corresponding to light detector rows i−1, i, i+1, and so on. This type of exposure is also referred to as "rolling shutter exposure" because the exposure may be thought of as being implemented using a camera shutter one line of light detectors wide (i.e., that is only wide enough to expose one line of light detectors at a time), that "rolls" or scans sequentially across spatially-successive lines (e.g., the rows or columns) of light detectors in a given direction (e.g., up/down, left/right), to thereby sequentially expose the spatially-successive lines of light detectors. In an embodiment, exposure controller 362 sequentially exposes the spatially-successive lines of light detectors at a rate (referred to as a "line exposure rate") that is greater than both frequencies F0, F1 of the FSK waveforms representing logic levels 0, 1 in transmitted light packets. The line exposure rate is equal to 1/τ.

In a variation of the above-described line exposure mode, the enable signals 361 may be generated to be slightly offset in time but overlapping, so that the exposure of each line time-overlaps the exposure of the spatially-successive line. For example, row i−1 begins its exposure at a time $t_{i-1}$, and while being exposed (e.g., before time $t_{int}$ expires for row i−1), row i begins its exposure, and while being exposed (e.g., before time $t_{int}$ expires for row i), row i+1 begins its exposure, and so on. This variation of the line exposure mode results in time spaced lines of sampled light corresponding to light detector rows i−1, i, i+1, but with overlapping exposure times for successive rows.

Figure 3C:
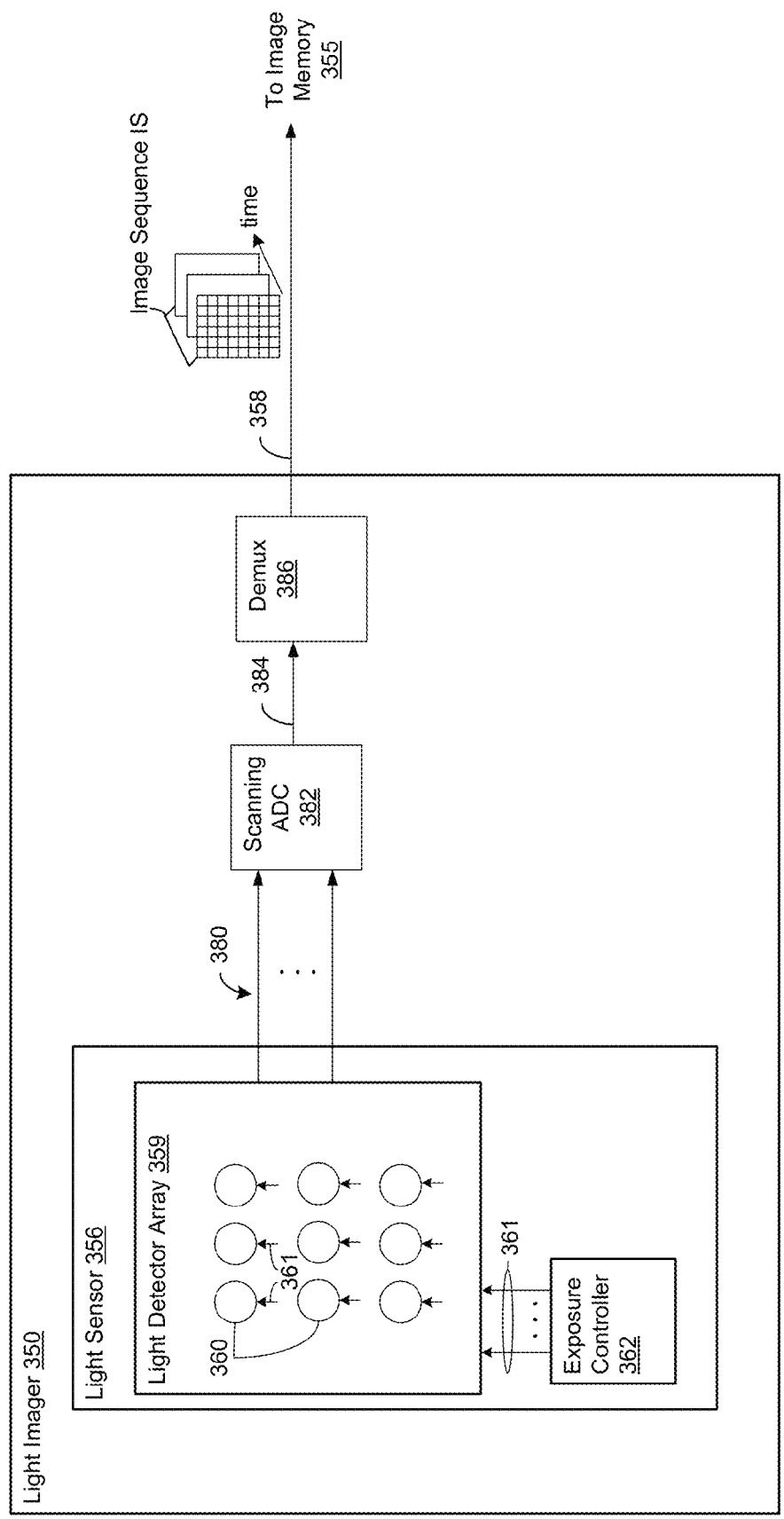
FIG. 3C is a block diagram of a light imager including light sample digitizing modules, according to an embodiment.

FIG. 3C is a block diagram of light imager 350 including light sample digitizing modules, according to an embodiment. Light detectors 360 provide corresponding sampled outputs 380 to a light detector (or pixel) scanning analog-to-digital converter (ADC) 382 that sequentially scans across each of the light detectors and digitizes its corresponding sampled output, to produce sequential, digitized sampled outputs 384. A demultiplexer 386 converts the sequential, digitized sampled outputs into an array of digitized, sampled outputs representative of images 358. Use of scanning ADC 382 and demultiplexer 386 reduces the number of ADCs that might otherwise be required to digitize all of the sampled outputs 380 in parallel.

Detector

Detector 352 includes a beam position determiner module 370a, and a SFD detector/demodulator module 370b (collectively referred to as "modules 370" and "modules 370a, 370b"), which cooperate to process the sequence of images stored in memory 355, namely to:

determine a position of each beam recorded in the images, such as an x, y center coordinate of the beam in each image (using beam position determiner 370a); and from the modulated light recorded at the determined beam positions, both detect any delimiters (SFDs) and demodulate any data bits conveyed by that recorded light (using detector/demodulator 370b).

As described above, light detectors 360 sample FSK waveform pulses in light 306, such as the pulses of waveforms 406, 408 at frequencies F0, F1 (representing logic levels 0, 1), and provide the resulting samples 358 to modules 370a, 370b, e.g., in a sequence of 1-dimensional or 2-dimensional images IS.

To detect a beam position, beam position determiner 370a raster scans the full area of each image in the sequence of images (e.g., in image sequence IS) stored in memory 355, e.g., first, second, third, and fourth sequential images, and so on, in search of recorded light energy that has a correlated position across the sequence of images. In other words, a beam position is determined when beam position determiner 370a detects a spot of modulated light, i.e., modulated light energy, centered on the same position, e.g., an x, y position corresponding to a row, column position, in each of the sequential images. Beam positions for multiple, spatially-separated, simultaneously recorded beams may be determined in this manner From each determined position, SFD detector/demodulator 370b associates corresponding light samples 358, over multiple recorded images, to one of: a demodulated data bit level, i.e., logic 0 or logic 1; a demodulated data delimiter; and a detected SFD.

Figure 5:
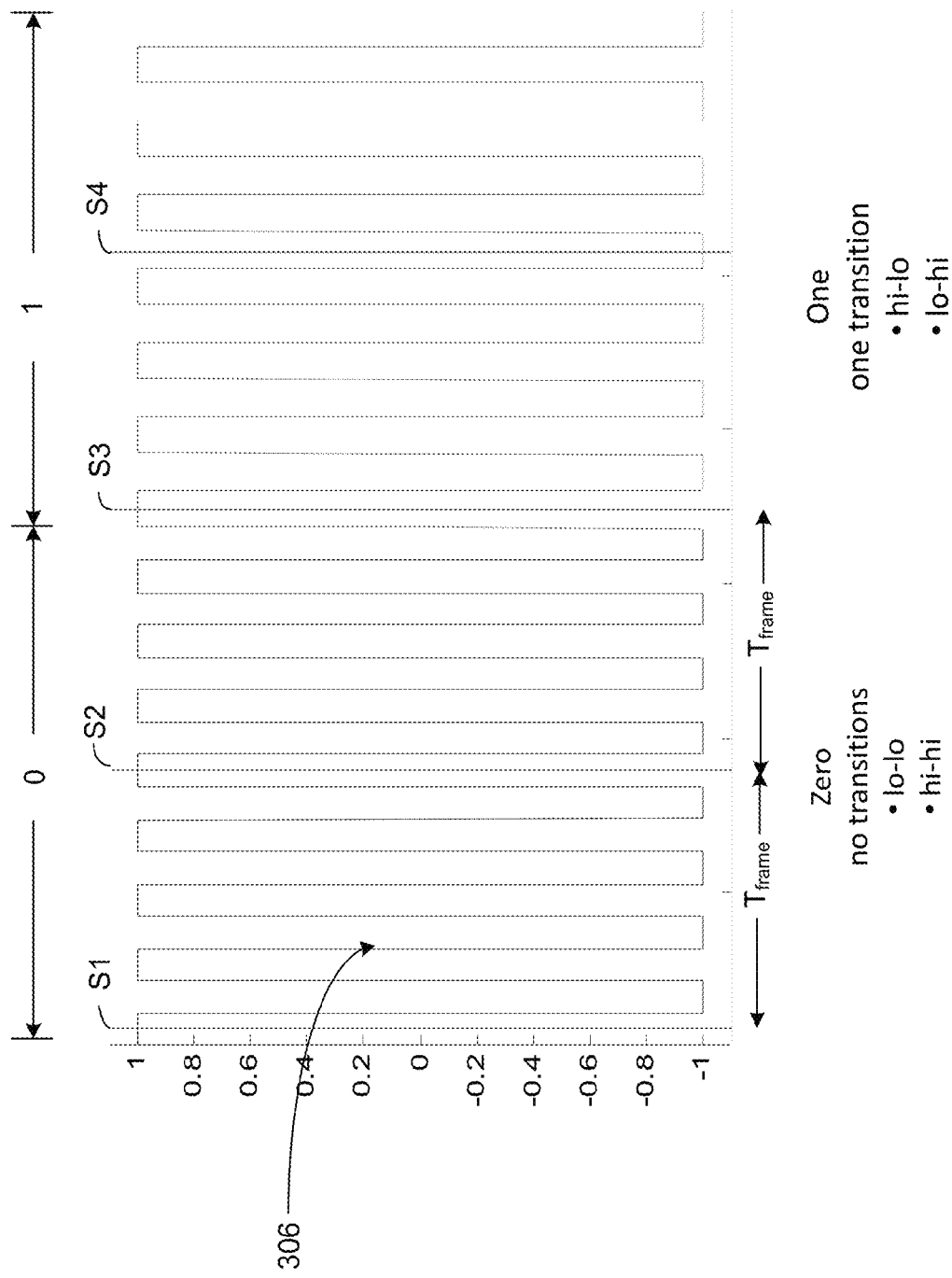
FIG. 5 is a light amplitude/intensity vs. time diagram helpful in understanding how a light receiver detector/demodulator of FIG. 3B associates light samples with demodulated data bits.

FIG. 5 is a light amplitude/intensity (y-axis) vs. time (x-axis) diagram helpful in understanding how SFD detector/demodulator 370b associates light samples 358 with demodulated data bits. In the example of FIG. 5, exemplary light signal 306 conveys a logic 0 followed by a logic 1, i.e., the light is intensity modulated at FSK frequencies F0 and F1 for first and second bit periods, i.e., where each bit period is twice frame period $T_{frame}$. On the diagram of FIG. 5, light intensity values of 1, −1 correspond to light intensity values of ON, OFF, (or HIGH, LOW) respectively. Assuming light 306 impinges on a given one of light detectors 360, then that light detector samples light 306 once every frame period $T_{frame}$ (i.e., twice per bit period), in accordance with a receiver sample timeline, to produce a sequence of time-spaced light samples S1, S2, S3, and S4, with an arbitrary sample phase relative to the bit periods. If light 306 is sampled once per frame period while the FSK waveforms at frequencies F0, F1 may produce 3 or 4 full cycles per frame period, the FSK waveforms are under-sampled compared to the Nyquist rate, i.e., two samples per FSK waveform cycle.

During the first bit, or logic 0, period, the frequency/timing relationship between the 120 Hz ON-OFF keying of light 306 and the light sample spacing, i.e., the frame period $T_{frame}$, causes consecutive light samples S1 and S2 to be in the same intensity state, i.e., at the same level (either ON/HIGH). In the example of FIG. 5, consecutive samples S1 and S2 are both ON. However, the absolute level, e.g., ON or OFF, depends on the sample phase of the receiver sample timeline. Therefore, if two consecutive light samples indicate consecutive same ON-ON or OFF-OFF states, then detector/demodulator 370b associates this condition with, and demodulates, a logic 0.

During the second bit, or logic 1, period, the frequency/timing relationship between the 105 Hz ON-OFF keying of light 306 and the light sample spacing causes successive light samples S3 and S4 to toggle between states either (ON then OFF, or OFF then ON). In the example of FIG. 5, consecutive samples S3 and S4 transition from ON to OFF. However, in other examples, with different sample phases of the receiver sample timeline, S3 and S4 may toggle from OFF to ON. Therefore, if two consecutive light samples indicate a state transition ON-OFF or OFF-ON, then detector/demodulator 370b demodulates a logic 1.

The above-described exemplary demodulation of FSOOK modulated light is based on under-sampling the FSK waveform. Therefore, such demodulation is referred to herein as under-sampled FSOOK (UFSOOK) demodulation.

Modules 370a, 370b also monitor light samples (i.e., images) 358 to detect light modulated with the Illegal frequency, as an indicator of a SFD associated with a light packet. As mentioned above in connection with demodulated data bits, the relationships between the frame period and the frequencies F0, F1 respectively causes detected light in two consecutive images always to be either in the same state, or in different states. However, the relationship between the frame period and the Illegal frequency causes detected light to toggle ON and OFF over four consecutive images in an ON-OFF pattern that cannot occur when the light is modulated at frequencies F0, F1. More specifically, if the light samples indicate any of patterns ON-ON-OFF-OFF, OFF-OFF-ON-ON, ON-OFF-OFF-ON, and OFF-ON-ON-OFF over four consecutive images, then modules 370a, 370b detect the Illegal frequency associated with the data delimiter.

Modules 370a, 370b also monitor light samples 358 to detect light modulated with the HiRate frequency, as an indicator associated with the SFD. An SFD modulated at the HiRate frequency may be more readily detected relative to an SFD modulated at the Illegal frequency when embedded with message data bits (e.g., logic 0, 1) because the HiRate frequency is more easily distinguished from the logic 0, 1 FSK frequencies than the Illegal frequency, which falls between those frequencies.

While light detectors approximately maximally detect frequencies F0, F1 in the modulated light, i.e., produce a near maximum amplitude output in response to the matched frequency, the integration time of the light detectors is too long to respond fully to the much greater HiRate frequency. Therefore, light detectors 360 are suboptimal energy detectors/samplers of the HiRate frequency, and provide an average, e.g., approximately ½ maximum, amplitude output (i.e., sampled output) in response to the HiRate frequency. Therefore, modules 370a, 370b detect the SFD in modulated light beam 306 when light detectors 360 provide the average, lesser amplitude outputs in response to sequential images. Similarly, in a transmit embodiment in which a reduced light intensity serves as an alternative for the HiRate frequency, light detectors 360 provide an average, lesser amplitude indicative of the reduced light intensity.

From recorded sampled light at a determined position in a sequence of images, modules 370a, 370b demodulate frequencies F0, F1 into data bit logic levels, detect the HiRate frequency, and detect the Illegal frequency associated with the SFD. Modules 370a, 370b also detect the number of frames over which each of the above mentioned frequencies extend. In this way, detector 352 deconstructs or determines the modulated light packets conveyed in the recorded light beam(s). Modules 370a, 370b pass such information to controller 354 over a bidirectional interface 374. For example, over interface 374, modules 370a, 370b indicate detected SFDs from recorded light packets to controller 354, and provide demodulated data bits from the light packets to the controller.

Controller

Controller 354 (also referred to herein as a "protocol processor") includes a memory 376 to store control logic protocol light packet definitions, and a frame period. Controller 354 provides light packet protocol definitions to detector 352 over interface 374. Based on the information from detector 352 and the contents of memory 376, controller 354 operates and controls receiver 308. Controller 354 also controls imager 350 over interface 374, e.g., the controller may command exposure controller 363 to operate in either of the global exposure mode or the line exposure mode.

Multi-Light Transmitter

Figure 6:
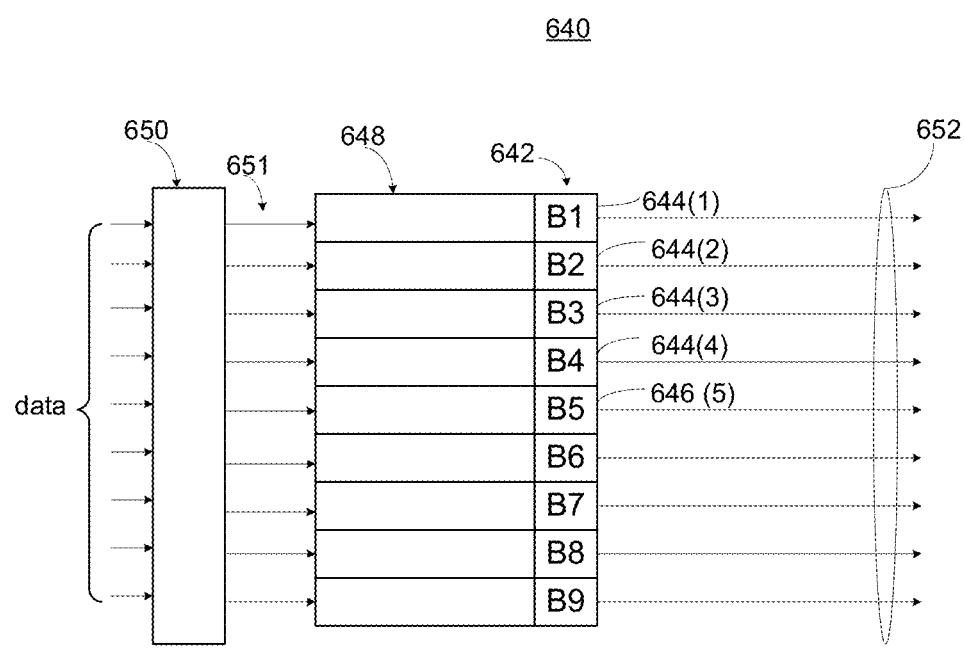
FIG. 6 is a block diagram of an example multi-light transmitter to transmit light packets.

FIG. 6 is a block diagram of an example multi-light transmitter 640 to transmit light packets. Light transmitter 640 includes an array or group of spatially-separated lights 642, which may be spatially-arranged in either 1-dimensionion or in 2-dimensions.

Transmitter 640 includes light modulators 648, which may be implemented similarly to modulator 309 in FIG. 3, each to modulated light from a corresponding one of lights 642. Transmitter 640 may include a controller 650, including memory and one or more clock and timer circuits similar to those of controller 314. Controller 650 receives multiple parallel data inputs (e.g., one per light modulator) from data sources not shown, and generates modulator commands 651 in parallel to control multiple modulators 648, similar to the manner in which commands 320 control modulator 309. In an alternative embodiment, controllers, such as controller 314, may be incorporated into each of modulators 648 separately.

In response to commands 651, modulators 648 modulate their corresponding lights 642 to transmit their respective light packets in spatially-separated light beams 652 according to the light packet definition of FIG. 4B, to convey data bits received over the data inputs. In response to commands 651, modulators/lights 648/642 may transmit their respective light packets with any number of different inter-packet timing relationships. For example, modulators/lights 648/642 may transmit their respective light packets simultaneously with each other. Alternatively, the light packets may be transmitted in a serial manner, one after the other. Alternatively, the light packets may be transmitted with their respective start times offset slightly with respect to each other. Any combination of such inter-packet timing relationships is possible.

In an alternative embodiment, some of lights 642 may modulate their respective light beams, while others may transmit unmodulated light beams.

Implicit Photogrammetric Position Determination

Implicit photogrammetric position determination of light receiver relative to a light transmitter is now described.

Figure 7:
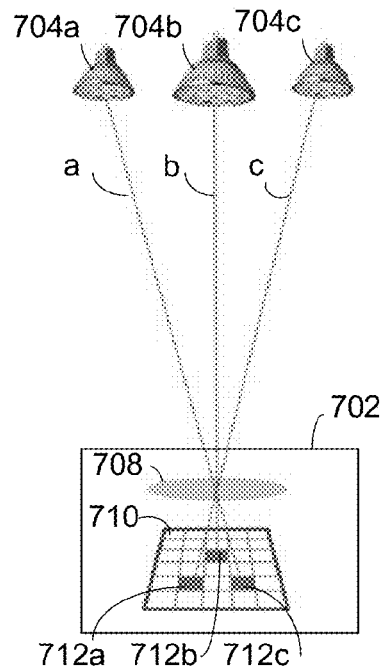
FIG. 7 is a light diagram useful to introduce the principles of photogrammetric position determination of a light receiver.

FIG. 7 is a light diagram useful to introduce the principles of photogrammetric position determination of a light receiver 702. Spatially-separated lights 704a, 704b, and 704c of a light array transmit respective spatially-separated light beams a, b, and c to light receiver 702, which includes an imaging lens 708 and a light sensor 710. Light beams a, b, c project through lens 708 onto light sensor 710, and illuminate light detectors (or sensor pixels) at spatially-separated positions 712a, 712b, 712c. The relationship between positions 712a, 712b, 712c and a focal point of lens 708 forms multiple triangles having vertices at lights 704 and light receiver 702. Assuming that real-world positions, e.g., <x, y, z> coordinates, for lights 704 and their corresponding image/sensor positions 712 are known, a real-world position of lens 708 relative to the positions of lights 704 may be determined based on the triangles. Therefore, a real-world position of light receiver 702 relative to lights 704 may be determined. This is referred to as photogrammetric position determination (or positioning), as would be appreciated by those of ordinary skill in the relevant arts. Photogrammetric equations are provided below and described in connection with FIG. 14.

Photogrammetric position determination requires knowledge of both the real-world position and the corresponding image positions of the lights upon which the determination is based. Each light is associated with two positions, namely, its real-world position and its corresponding image position. The real-world positions may be ascertained explicitly in explicit photogrammetric positioning, or implicitly in implicit photogrammetric positioning. In the explicit approach, each light transmits modulated light to indicate a unique light identifier. The light receiver recovers the IDs from the modulated light, and then retrieves real-world positions of the lights from a database of light positions, e.g., <x, y, z> coordinates, indexed by the IDs. In this way, the real-world light positions are said to be explicitly determined because all of the lights provide their IDs explicitly, from whence their positions in the database may be accessed/determined.

In the implicit approach, while some of the lights transmit their IDs, others do not. For example, some of the lights may transmit constant intensity, unmodulated light. Such lights do not explicitly provide their IDs. Therefore, their IDs, and associated real-world positions, must be inferred implicitly.

Figure 8:
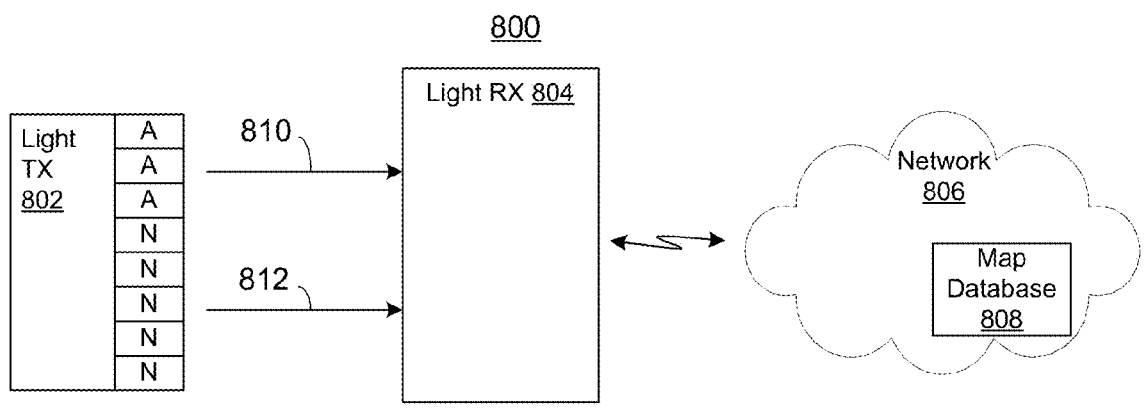
FIG. 8 is a system for implicit photogrammetric position determination, according to an embodiment.
Figure 10B:
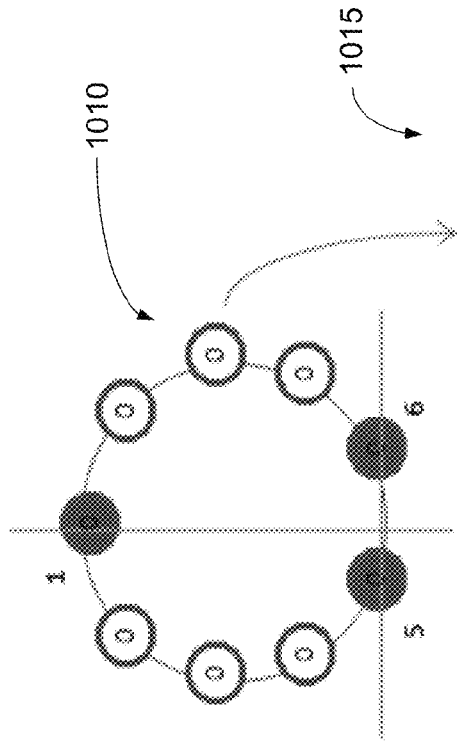
FIG. 10B is an illustration of yet another light map and its associated light position table.
Figure 10A:
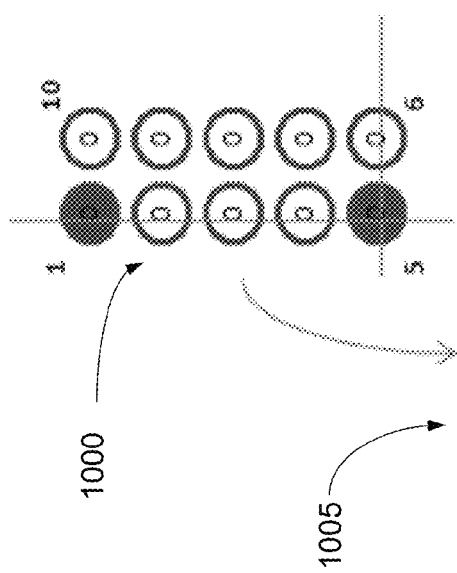
FIG. 10A is an illustration of another light map and its associated light position table, which may be stored in a light map database.

FIG. 8 is a system 800 in which implicit photogrammetric position determination may be performed, according to an embodiment. System 800 includes a light transmitter (TX) 802 to transmit light to a light receiver 804, which communicates in turn with a network 806, which may include the Internet. A light map database 808 may reside on a cloud-based server accessible through network 806. Light map database 820 stores predetermined light maps (also referred to as "reference light images"), each map representing a reduced-scale spatial arrangement of lights of an actual, deployed (real-world) light array. The lights depicted in the light maps are referred to as "map lights." The light maps may be indexed, or addressed, by one or more unique light IDs of the lights depicted in the light maps (and deployed in the light arrays). The light maps associate their depicted lights (i.e., map lights) with (i) matching light IDs, and (ii) their real-world positions (e.g., <x, y, z> coordinates) in deployed light arrays, e.g., in buildings, such as a shopping mall. Accordingly, access to a light map also provides access to, and indicates, the IDs of the lights depicted in the map and their corresponding real-world positions. Examples of light maps and their associated information are depicted in FIGS. 10A and 10B, described below.

Returning to FIG. 8, light transmitter 802 and light receiver 804 may be configured to operate similarly to multiple light transmitter 640 and light receiver 308, respectively. Light transmitter 802 includes multiple spatially-separated lights A to transmit spatially-separated light beams 810, each FSOOK modulated to indicate an SFD and a unique light ID, e.g., as described in light packet definition 450 of FIG. 4B, where the light ID may comprise some or all of the series of bits B1-B10. For example, bits B1 through B5 may be designated as light ID bits to carry an exemplary light ID "00011." Lights A and their modulated light beams 810 are referred to herein as "anchor lights" or "modulated lights" and "anchor light beams" or "unmodulated light beams," respectively. Light transmitter 802 also includes multiple spatially-separated lights N to transmit spatially-separated unmodulated light beams 812. Lights N and their unmodulated light beams 812 are referred to herein as "non-anchor lights" or "unmodulated lights" and "non-anchor light beams" or "unmodulated light beams," respectively.

Light receiver 804 samples and records spatially-separated anchor light beams 810 and non-anchor light beams 812 in a sequence of recorded images representing lights A, N of light transmitter 802. Light receiver determines positions (i.e., image positions) of the recorded anchor light beams and the non-anchor light beams in the recorded images. Light receiver 804 detects the unique light IDs from each of the recorded anchor light beams 810 using, e.g., UFSOOK demodulation. Using the detected light IDs as an index into map light database 808, light receiver 804 accesses/retrieves the light map that depicts anchor lights A associated with the detected anchor light IDs, i.e., a light map of lights A, N as positionally arranged in transmitter 802. In an alternative embodiment, light map database 808 may be stored in a local memory of light receiver 804, i.e., the light maps are collocated with the light receiver. In such an embodiment, the light receiver simply accesses its local memory for the relevant light map.

Light receiver 804 rotates and scales the retrieved light map as necessary so as to align the map anchor lights with their counterpart recorded anchor lights (i.e., recorded anchor light beams) in the recorded images. The map anchor lights are aligned with the recorded anchor lights having the same light ID. This also aligns the light map non-anchor lights with their counterpart non-anchor lights (i.e., non-anchor light beams) in the recorded images. The result is aligned pairs of map lights and recorded lights (i.e., light beams), each pair associated with a unique light ID and corresponding real-world position linked to the light map. Therefore, the aligned light map indicates the real-world positions of the lights A, N.

Light receiver 804 photogrammetrically determines a 3-dimensional position of the light receiver relative to light transmitter 802 based on (i) the real-world positions of the lights A, N ascertained from the aligned light map, and (ii) the already known positions of the recorded light beams in the recorded images. This is referred to as implicit photogrammetry because the light IDs and real-world positions of the non-anchor lights N were inferred from the aligned light map. The photogrammetric position determination may be performed in accordance with the equations described below in connection with FIG. 14.

Figure 9A:
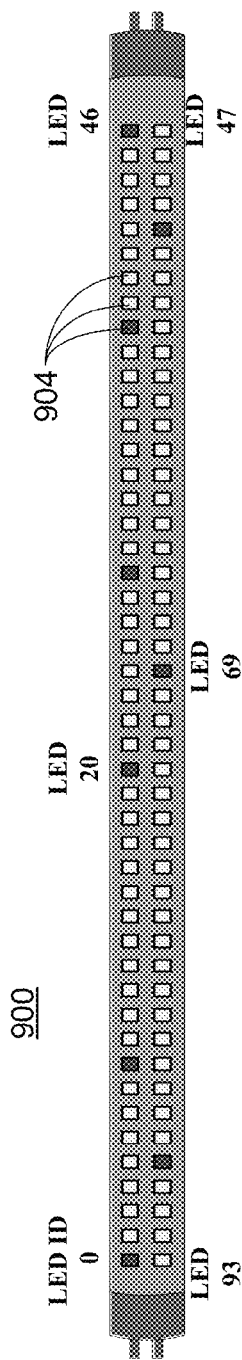
FIG. 9A is a diagram of an example transmit light array and corresponding light map that may be used in implicit photogrammetric determination.

FIG. 9A is a diagram of an example transmit light array 900, and its corresponding light map, that may be used in implicit photogrammetric determination. Light array 900 includes an array of 94 LEDs 904 (each depicted as a small square) spatially arranged in 2-dimensions to cover a shape of a standard fluorescent tube. LEDs 904 are indexed by increasing LED ID 0-93. The indexing is arbitrary and could be reordered any number of ways. The dark colored LEDs (i.e., dark squares) are modulated LEDs, i.e., anchor LED that transmit their IDs as FSOOK modulated light, while the light colored LEDs (i.e., light squares) are unmodulated LEDs, i.e., LEDs that transmit constant intensity light.

Light map database 808 stores the light map depicted in FIG. 9A corresponding to light array 900. In response to a request for a light map from light receiver 804 that contains, e.g., detected anchor LED IDs 20, 69, database 808 returns the light map, or a portion thereof, of light array 900. In other words, the request for the light map provides detected anchor LED IDs 20, 69 as an index to the correct light map to be returned. Database 808 returns the light map, or portion thereof, that depicts map anchor lights with IDs 20, 69, as well as other non-anchor map lights in the vicinity of the indexed anchor lights.

Figure 9B:
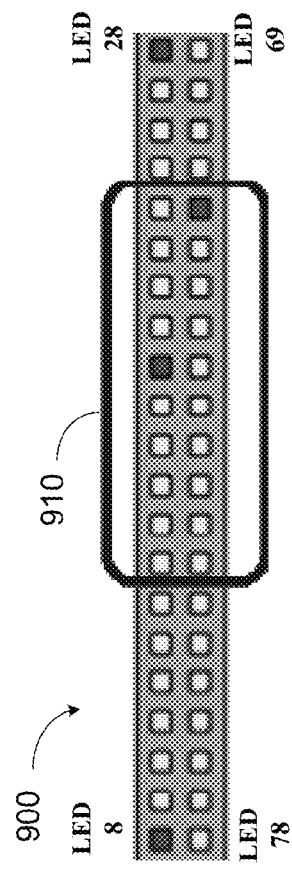
FIG. 9B is an illustration of a map portion of the light map from FIG. 9A, that may be returned to a light receiver in response to a request indexed by anchor light identifiers.

FIG. 9B is an illustration of a map portion 910 of the light map of light array 900 that may be returned to light receiver 804 in response to the request indexed by anchor LED IDs 20, 69. Portion 910 depicts (i) map anchor LEDs 20, 69, and (ii) map non-anchor LEDs in the vicinity of the anchor LEDs.

Figure 9C:
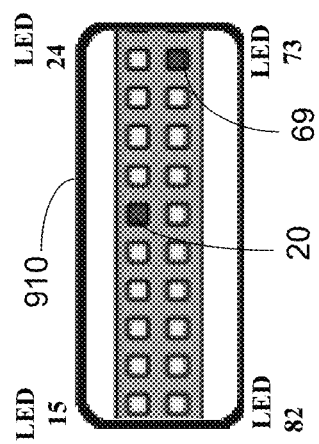
FIG. 9C is an illustration of the map portion from FIG. 9B that is returned to the light receiver.

FIG. 9C is an illustration of map portion 910 returned to light receiver 804. Associated with each light ID in map portion 910 is a real-world light position (not shown in FIG. 9C), which is accessible to light receiver 804. Once receiver 804 retrieves map portion 910, the light receiver rotates and scales retrieved map portion 904 to positionally align the (scaled, rotated) map anchor LEDs 20, 69 with their counterpart recorded anchor light beams in the images from which the IDs 20, 69 were detected. This also aligns the map non-anchor LEDs with their counterpart recorded non-anchor light beams. Light IDs and real-world positions associated with the light IDs for all of the aligned light beams are then accessible.

FIG. 10A is an illustration of another light map 1000 and its associated light position table 1005, which may be stored in light map database 808. The light map 1000 and light position table 1005 may be returned to a requesting light receiver upon request. The light position table 1005 lists light IDs and their corresponding real-world positions in <x, y, z> coordinates. The anchor LEDs have IDs 1 and 5. Therefore, a light map request naming anchor light IDs 1, 5, would result in light map 1000 and light position table 1005 being returned.

FIG. 10B is an illustration of another light map 1010 and its associated light position table 1015, which may be stored in map database 808. The anchor LEDs have IDs 1, 5, and 6. Assuming light receiver 804 receives light from a light array corresponding to light map 1010, the light receiver would detect anchor light IDs 1, 5, 6.

In connection with FIG. 10B, the receiver transmits the following message to map database 808 requesting a light map indexed by the detected (i.e., observed) anchor IDs: Observed_Anchor_IDs,[number observed (3)],[Anchor IDs (1,5,6)]

In response, the server storing light map database 808 returns light map 1010 along with the following information:

Map
[number of light anchors in map (3)], [Anchor ID numbers (1, 5, 6)], [Light Anchor locations <x1,y1,z1>, <x5,y5,z5>, <x6,y6,z6>], [number of non-anchor lights in the map (6)], [non-anchor ID numbers (2, 3, 4, 7, 8, 9)], [non-anchor light locations <x2,y2,z2>, <x3,y3,z3>, <x4,y4,z4>, <x7,y7,z7>, <x8,y8,z8>, <x9,y9,z>]

Many different positional arrangements of anchor lights are possible. Preferably, the anchor lights are arranged in the light array and corresponding light map so as to be rotation invariant, which avoids alignment ambiguities.

Flowchart for Implicit Photogrammetric Position Determination

FIG. 11 is a flowchart of an example method 1100 summarizing implicit photogrammetric position determination of a light receiver relative to a light transmitter.

1105 includes, in a light receiver, sampling and recording spatially-separated, modulated anchor (i.e., modulated) light beams from anchor (i.e., modulated) lights and non-anchor (i.e., unmodulated) light beams from non-anchor (i.e., unmodulated) lights of a light array, to produce a sequence of images of the light array. The light receiver may be a camera that "shoots" a short video of the light array, to produce the sequence of images. In an embodiment, the anchor light beams each comprises light modulated to indicate an SFD, followed by a unique light ID that is a series of bits, such as "0110," etc., each bit represented as light that is intensity modulated, e.g., FSOOK modulated, over a bit period at one of multiple FSK frequencies indicative of the bit. The non-anchor light beams are unmodulated.

1110 includes determining positions in the images where the modulated anchor light beams are recorded, and then demodulating, from the determined positions, the light IDs from the recorded anchor light beams. The demodulating may include UFSOOK demodulating the recorded anchor light beams.

1115 includes accessing a predetermined light map of the light array based on the demodulated light IDs. Such accessing may include transmitting, to a light map database residing in a network, a request for the light map of the light array containing lights having the demodulated light IDs, and receiving the requested light map and real-world light positions (e.g., in a table) associated with the lights in the light map.

In an embodiment, the light map defines a spatial arrangement of map anchor lights and map non-anchor lights that matches a reduced-scale spatial arrangement of the anchor lights and the non-anchor lights in the light array. The map anchor lights may be specifically annotated in a manner detectable by the light receiver to facilitate alignment therewith, as described below. Associated with the light map is a table listing light IDs of the map lights in association with their corresponding real-world positions, e.g., <x, y, z> coordinates, in the light array, as deployed.

1120 includes positionally aligning the light map with the recorded anchor light beams. That is, positionally aligning the map anchor lights with recorded anchor lights having the same IDs (i.e., where the detected IDs match the map light IDs returned from the map light database). Positionally aligning may include rotating and scaling the retrieved light map so as to positionally align the map anchor lights with their corresponding recorded anchor lights.

1125 includes accessing real-world positions of the anchor and the non-anchor lights of the light array based on the aligned map, which implicitly indicates the IDs and corresponding real-world positions of the recorded non-anchor light beams.

1130 includes photogrammetrically determining a 3-dimensional, position of the light receiver relative to the light array based on the real-world light positions accessed in 1125 and the determined positions of the light beams in the recorded images. The photogrammetrically determining may include determining the position according to the photogrammetric technique described below in connection with FIG. 14.

Light ID Error Detection and Correction in Photogrammetric Position Determination Light ID error detection and correction related to photogrammetric position determination is now described. Embodiments include lights that transmit their light IDs using FSOOK modulated light and a light receiver that demodulates the light IDs using UFSOOK. Other types of modulation and demodulation are possible.

As described above in connection with implicit photogrammetric determination, lights transmit their respective light IDs, which may be recovered in a light receiver and then used to index corresponding real-world positions, e.g., <x,y, z> coordinates, of the lights. The lights are imaged, i.e., recorded in images, in the light receiver. Therefore, the real-world positions of the lights have corresponding, or matching, image positions in the light receiver. The real-world positions of the lights and their correctly matching image positions are used to determine a position of the receiver, photogrammetrically.

If, however, the receiver recovers (e.g., demodulates) a particular ID incorrectly, then the incorrect ID indexes an incorrect real-world position, i.e., a real-world position of the wrong light. The incorrect real-world position does not match the image position because the image position is matched to the real-world position of a different light, namely, the light having the ID that should have been demodulated at the image position from which the incorrect ID was demodulated. The incorrectly matched real-world and image position pair result in an incorrectly determined photogrammetric position. Accordingly, the light ID error detection and correction embodiment described herein determines such demodulation errors and then corrects those errors, so that, as a result, the indexed real-world position of each imaged light correctly matches the image position for that light. A correct photogrammetric receiver position may then be determined based on the correctly matched pairs of real-world and image positions.

Light ID error detection and correction is based on establishing predetermined light neighborhoods in which each light has a predetermined set of neighboring or "neighbor" lights. Because a given ID identifies/represents a light, it follows that the given ID has predetermined neighbor IDs, i.e., IDs of lights in the same neighborhood as the light having the given ID. In other words, it is assumed that a "light" and its "ID" both represent the light. Light ID error detection and correction may be performed in system 800 of FIG. 8, extended to include the above-mentioned light neighborhoods as a feature. For example, light map database 808 is extended to include a set of neighbor IDs for each ID (such as a demodulated ID) used to index the database. That is, each ID indexes (i) the set of neighbor IDs in the neighborhood to which the indexing ID belongs, and (ii) the real-world position of the indexing ID. Light receiver 804 uses each demodulate ID to index (and retrieve) a corresponding real-world light position and a set of corresponding neighbor IDs, to construct a position table including the demodulated IDs, their corresponding real-world positions, and their corresponding sets of neighbor IDs. Light receiver 804 uses the position table to cross-reference the demodulated IDs against the sets of neighbor IDs to perform light ID error detection and correction, as will be described below.

Light Neigborhoods

Examples of light neighborhoods and their effectiveness in correcting demodulated ID errors are now described.

A neighborhood of lights may be considered to be an intuitive, or natural, partitioning of lights that may be associated with, e.g., LED lighting. Examples of a neighborhood are an LED light panel and an LED light bar. An exemplary LED light panel may include a 15×15 LED rectangular grid, in which the 225 LEDs comprise a single neighborhood. Each LED may transmit a unique ID, resulting in 225 different IDs all belonging to the same neighborhood. An alternative arrangement segments the same 15×15 LED rectangular grid into 4 quadrants, each quadrant assigned to a single ID, such that the light panel is represented by 4 IDs. In this alternative arrangement, the 4 IDs collectively form a single neighborhood.

Figure 12:
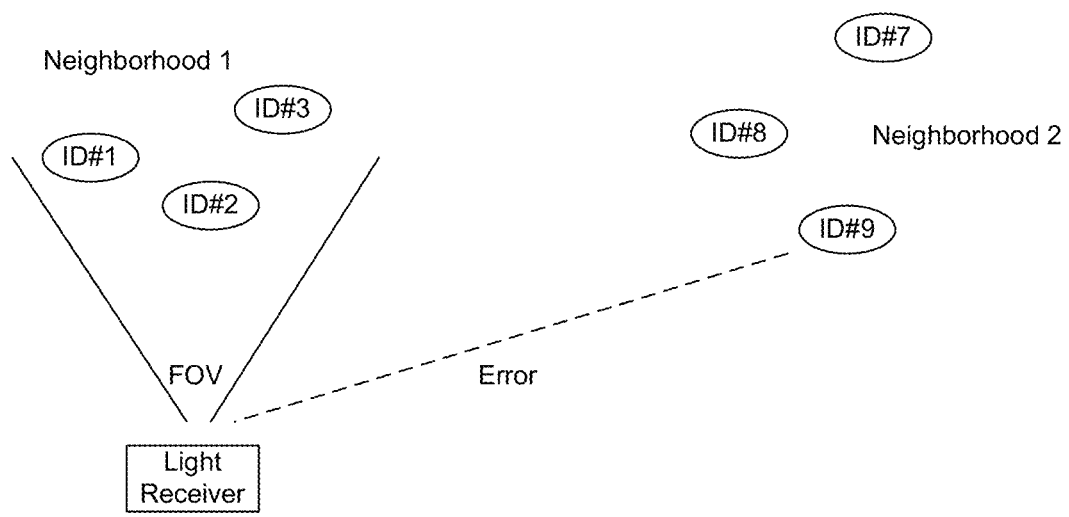
FIG. 12 is a block diagram of an example computer processor system configured for multiphase sampling processing.

FIG. 12 is an illustration of an error example in which a demodulated ID error has occurred. A light receiver has a field-of-view (FOV) encompassing lights from a neighborhood 1, including three lights: ID1, ID2 and ID3. Assume the light receiver incorrectly demodulates ID3 as ID9 from neighborhood 2, which includes three lights ID7, ID8, and ID9 that are mutually exclusive of the light IDs from neighborhood 1. As a result, the light receiver retrieves real-world positions indexed by demodulated ID1, ID2, and ID9 (i.e., for the lights having these IDs). The real-world position for ID9 is an incorrect real-world position and, therefore, does not match the image position for ID3 in the receiver. Accordingly, the photogrammetric position determination based on the retrieved light IDs will be erroneous.

Conceptual Approach for Error Detection and Correction Based on Light Neighborhoods As mentioned above, for the light ID error detection and correction described herein, each demodulated ID indexes (and retrieves) a real-world position for the ID and a set or list of IDs in the same neighborhood (i.e. its neighbors). In the error example of FIG. 12, the following information in Table 1, referred to as the position table, is retrieved by light receiver 804 from extended database 808. The $1^{st}$ column in Table 1 lists the demodulated IDs used to index database 808, the $2^{nd}$ column lists the real-world positions of each indexing ID, and the $3^{rd}$ column list the set of neighbor IDs (also referred to herein as lists of neighbor IDs) for the indexing ID.

Position Table 1

| ID | Coordinates | Neighbor Lists (Sets) |
|---|---|---|
| 1 | <x, y, z> | 2, 3 |
| 2 | <x, y, z> | 1, 3 |
| 9 | <x, y, z> | 7, 8 |

With reference to position Table 1, cross-referencing all of the lists or sets of neighbor IDs ($3^{rd}$ column) against all of the indexing demodulated IDs ($1^{st}$ column) indicates an error as a statistical inconsistency, namely, the 1st column indexes (demodulated) ID1 and ID2 do not list ID9 in their $3^{rd}$ column neighbor lists. Likewise, the neighbor list for index ID 9 indicates a similar error in that ID 1 and ID2 are not listed in the neighbor list.

Position Table 2 below indicates how the Neighbor List above would have looked without a demodulation error, i.e., how one would expect it to look. Position Table 2 is referred to as the Expected Position Table.

Position Table 2

| ID | Coordinates | Neighbor List (Sets) |
|---|---|---|
| 1 | <x, y, z> | 2, 3 |
| 2 | <x, y, z> | 1, 3 |
| 3 | <x, y, z> | 1, 2 |

Without the error, each index ID (in the $1^{st}$ column) appears in the neighbor list twice. But, as seen in position Table 1, while ID3 appears twice as a neighbor ID in the neighbor lists, it is not listed as an index (demodulated) ID; hence, this reveals that demodulated ID9 is an error; ID3 should have been demodulated instead. The statistical inconsistency reveals an invalid demodulated ID9, and a missing ID3. The error is corrected with a retrieval of the following information set (row) for index ID3, which replaces the erroneous information set (row) for index ID9:

| ID | Coordinates | Neighbor List (Sets) |
|---|---|---|
| 3 | <x, y, z> | 1, 2 |

ID3 corresponds to an expected neighbor list (i.e., ID1 and ID2).

Set Notation to Describe Light Neighborhoods

First consider a set of k objects $\{1 \ldots k\}$. A matrix with dimensions (k by k−1) can be formed by eliminating, from the set, each row's index. A set with 5 objects will be used as an example; that is, the set $\{1\ 2\ 3\ 4\ 5\}$ forms the following matrix.

| Row Index (ID) | Set (Neighbor Sets) |
|---|---|
| 1 | $\{2\ 3\ 4\ 5\}$ |
| 2 | $\{1\ 3\ 4\ 5\}$ |
| 3 | $\{1\ 2\ 4\ 5\}$ |
| 4 | $\{1\ 2\ 3\ 5\}$ |
| 5 | $\{1\ 2\ 3\ 4\}$ |

There are 5 sets and elements of the sets are used k−1=4 times, as expected. This represents statistical consistency between the row indexes and the objects listed in the sets. Now, eliminate the $3^{rd}$ row and modify the matrix accordingly.

| Row Index | Set |
|---|---|
| 1 | $\{2\ 3\ 4\ 5\}$ |
| 2 | $\{1\ 3\ 4\ 5\}$ |
| 4 | $\{1\ 2\ 3\ 5\}$ |
| 5 | $\{1\ 2\ 3\ 4\}$ |

As a result, each remaining set references the missing row index 3, but because row three is missing, and the set $\{1\ 2\ 4\ 5\}$ is absent, there is a lack of corresponding reference to the other row indices; that is, set elements 1, 2, 4, 5 occur k−2=3 times while set element 3 occurs k−1=4 times. It can be concluded that the set with row index 3 is missing. The missing row index is revealed as a statistical inconsistency between the row indexes and their corresponding sets. However, because all the remaining row indices (1, 2, 4, 5) occur k−2=3 times one can also conclude that the remaining row indices and related sets are valid (consistent); that is, they belong to the original set. This represents detecting a missing set index, but there are no erroneous set members.

Now consider the original set matrix.

| Row Index | Set |
|---|---|
| 1 | $\{2\ 3\ 4\ 5\}$ |
| 2 | $\{1\ 3\ 4\ 5\}$ |
| 3 | $\{1\ 2\ 4\ 5\}$ |
| 4 | $\{1\ 2\ 3\ 5\}$ |
| 5 | $\{1\ 2\ 3\ 4\}$ |

Replace the third row with an index and set not related to the original set; e.g., row index 6 from the set $\{6\ 7\ 8\ 9\ 10\}$.

| Row Index (ID) | Set (Neighbor Sets) |
|---|---|
| 1 | $\{2\ 3\ 4\ 5\}$ |
| 2 | $\{1\ 3\ 4\ 5\}$ |
| 6 | $\{7\ 8\ 9\ 10\}$ |
| 4 | $\{1\ 2\ 3\ 5\}$ |
| 5 | $\{1\ 2\ 3\ 4\}$ |

A cross-reference of the row indexes (IDs) against the set elements (sets of neighbor IDs) in the above table may take the form of a histogram.

Figure 13:
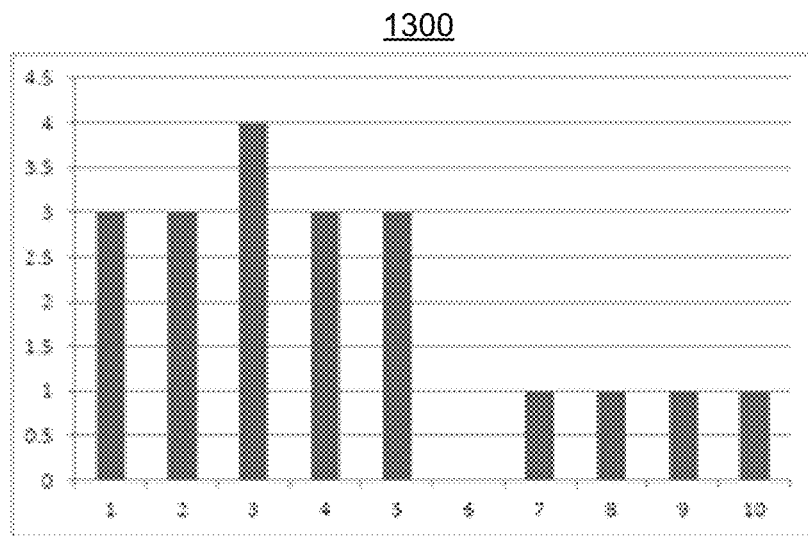
FIG. 13 is a block diagram of an example system including a system or apparatus to sample and record light beams as a sequence of images and process the recorded images in accordance with one or more embodiments described herein.

FIG. 13 is an illustration of an example histogram 1300 that cross-references the index IDs against their sets of neighbor IDs for the above table. Histogram 1300 has an x-axis that is the union of the index IDs and the IDs listed in the sets of neighbor IDs. The y-axis is the number of times that each value on the x-axis occurs in the neighborhood sets. The histogram represents a cross-reference between the index ID and the sets of neighbor IDs, which reveals statistical consistencies and inconsistencies between these two groups. The consistencies indicate valid demodulated IDs, while the inconsistencies indicate invalid demodulated IDs and missing IDs. More specifically, histogram tallest peaks (i.e., first peaks) and next tallest peaks (i.e., second peaks) indicate missing index IDs and valid demodulated IDs, respectively, while an absence of an ID (i.e., no peak at all) indicates an invalid demodulated ID.

Accordingly, with reference to histogram 1300 an absence of any element at ID6 indicates that ID6 is an invalid demodulated ID. The peak at element 3 indicates ID3 is a missing ID. Therefore, if row index 6 is replaced with row index 3 and its related set of neighbor IDs, then the error is corrected.

Generalized Method and Corresponding Flowcharts for Error Detection and Correction FIGS. 14A, 14B, and 14C are connected flowcharts that collectively summarize an example generalized method of light ID error detection and correction, described in the detailed numbered sequence below. The blocks in the flowcharts are cross-referenced parenthetically to the relevant sequence numbers below. At various branches in the flowcharts of FIGS. 14B and 14C, reference is made to relevant ones of illustrative Examples 1-11 depicted in FIGS. 16A-16K described below, as appropriate. A flowchart of an overarching summary method is described below in connection with FIGS. 17 and 18 after the Examples 1-11 are presented.

FIG. 14A is a flowchart of an example method 1400 to determine which of two error detection and correction cases to use, namely, Case 1 for a full set of observed (i.e., recorded or imaged) lights, or Case 2 for a less than full set of observed lights (e.g., one or more lights is burnt out and, therefore, not imaged).

Let k be the number of elements in the set, n is the number of errors in the set, and m is the number of missing set members (i.e., unobserved, unrecorded) (flowchart block 1404).

First determine which of two cases to use: 1) full set; 2) less than a full set

To determine which case to use, perform the following:
1. Decode/demodulate the ID ($ID_i$) for each observed light (1406). Each $ID_i$ coordinate/index request to the cloud server (e.g., database 808) will return the lights, e.g., LED, coordinates and a neighborhood ID vector (i.e., list or set of neighbor IDs) which will have a length $L_i$. There will be k such vectors (one for each observed LED light). As a result, a position table is constructed, in which each row includes an indexing (demodulated) ID ($1^{st}$ column), the corresponding real-world position ($2^{nd}$ column), and the corresponding set of neighbor IDs (i.e., the neighborhood ID vector of elements) ($3^{rd}$ column). The total number of elements in the neighborhood is then j=L+1 where L=median ([$L_i$ . . . $L_i$ . . . $L_k$]) (1408-1414).
2. The number of missing elements is given as m=j−k. If m=0 then use the case 1 algorithm (full set) (1416, 1420—Case 1 method); otherwise, use the case 2 algorithm (less than a full set) (1416, 1418—Case 2 method).

Case 1—Full Set (e.g. All of the Lights in the Neighborhood are Seen, but their IDs May or May not have been Demodulated Correctly)

FIG. 14B is a flowchart of an example method 1420 of performing error detection and correction for Case 1, i.e., for a full set of observed lights, which may or may not have had their IDs incorrectly demodulated. In the treatment below, the phrase "detect an ID" or "a detected ID" is a generalization of "demodulate an ID" or "a demodulated ID." The phrases may be used interchangeably and equivalently.

1. If k is odd and greater than 2, then the maximum number of index (i.e. ID) errors n we can detect is given as floor(k/2).
2. If k is even and greater than 3, then we can detect n=k/2−1 index errors.
3. If there are no decoding errors then all occurrences of the set elements will be the same and equal to k−1. Perform a cross-reference of the indexes (detected IDs) against set elements (sets of neighbor IDs) to reveal statistical consistencies and inconsistencies between the detected IDs and the sets of neighbor IDs. The consistencies indicate valid detected IDs, while the inconsistencies indicate invalid detected IDs and missing IDs. The cross-reference may take the form of a histogram having an x-axis that is the union of the detected IDs and the IDs listed in the neighborhood lists, and a y-axis that is the number of times that each value on the x-axis occurs in the neighborhood sets. Histogram peaks, and absences thereof, indicate valid IDs, invalid detected IDs, and missing IDs (1432-1436).
4. If there are n errors then valid element members will have an occurrence of k−n−1; missing valid indices have an occurrence of k−n; invalid set members will have an occurrence that does not exceed n; and all invalid set indices (erroneous IDs) will have an occurrence that does not exceed n−1 (1432-1436).
5. The number of errors n is equal to the number of max occurrences p (i.e. the number of times the maximum occurs) (1432-1436).
6. To correct single index (ID) errors, replace the index having a minimum set member occurrence of less than or equal to n−1, with the index having a set member occurrence of k−n (1432-1436).
7. To correct multiple errors, obtain the <x,y,z> positions for all the "missing" indices having a set member occurrence of k−n; calculate the Euclidean distance between each missing index and the valid (correct) index locations, and then replace each index having a minimum set member occurrence of less than or equal to n−1, with the missing index having the smallest Euclidean distance (1438).
8. For an over determined system (i.e. we have more lights than needed for the positioning algorithms), an alternative to correcting multiple errors is just to detect which lights have an ID decoding error and remove them from consideration.

Case 2—Less than a Full Set (e.g. Not all the Lights in the Neighborhood are Seen)

FIG. 14C is a flowchart of an example method 1418 of performing error detection and correction for case 2, i.e., for the case when not all of the lights that should have been observed are observed.

1. If k is odd and greater than 2, then the maximum number of index (i.e. ID) errors n we can detect will be floor(k/2).
2. If k is even and greater than 3, the maximum number of index (i.e. ID) errors n we can detect will be k/2−1.
3. If there are no errors then all occurrences of the set elements will be the same and equal to k−m−1; which in this case indicates all element members are valid. Perform a cross-reference of the indexes (detected IDs) against set elements (sets of neighbor IDs) to reveal statistical consistencies and inconsistencies between the detected IDs and the sets of neighbor IDs. The consistencies indicate valid detected IDs, while the inconsistencies indicate invalid detected IDs and missing IDs. The cross-reference may take the form of a histogram having an x-axis that is the union of the detected IDs and the IDs listed in the neighborhood lists, and a y-axis that is the number of times that each value on the x-axis occurs in the neighborhood sets. Histogram peaks, and absences thereof, indicate valid IDs, invalid detected IDs, and missing IDs (1452-1456).
4. If there are n errors and m missing elements then valid element members will have an occurrence of j−m−n−1; missing valid indices have an occurrence of j−m−n; invalid set members will have an occurrence that does not exceed n; and all invalid set indices (errors) will have an occurrence that does not exceed n−1 (1452-1456).
5. To determine the number of errors n, let p be the number of maximum occurrences; then n=p−m. (1452-1456.)
6. For case 2 we cannot correct single index errors with simple replacement; rather, obtain the <x,y,z> positions for all the "missing" indices having a set member occurrence of k−n; calculate the Euclidean distance between each missing index and the valid (correct) index locations, and then replace each index having a minimum set member occurrence of less than or equal to n−1, with the missing index having the smallest Euclidean distance. There will be m unused indices due to the fact that case 2 has less than a full set (1458).
7. For an over determined system (i.e. we have more lights than needed for the positioning algorithms), an alternative to correcting errors is just to detect which lights have an ID decoding error and remove them from consideration.

Calculating Euclidean Distance

The Euclidean distance between two objects located at $<x_1,y_1,z_1>$ and $<x_2,y_2,x_2>$ is given as $$D=\sqrt{(x_1-x_2)^2+(y_1-y_2)^2+(z_1-z_2)^2}.$$

The smaller the Euclidean distance D the closer together are the objects. Euclidean distance is used to determine the ID of an observed (i.e., imaged light) given a position table of IDs and their related real-world locations.

Minimum Euclidean Distance Example

FIG. 15 is an illustration of an example set of neighborhood lights 1505 in which a missing light ID, determined using the error detection and correction described above, may be assigned to an image position based on Euclidean distances. Assigning the missing ID to an image position is referred to as place-identifying the missing ID in the image (see steps 1438 and 1458 in flowchart FIGS. 14B and 14C).

In FIG. 15, each light in neighborhood light set 1505 is imaged at a determined position in a light receiver. A light 1510 at position <4,10>, which is not part of the neighborhood light set 1505, is not imaged in the light receiver. However, it assumed that the light receiver erroneously demodulated the ID for light 1510 from an image position at which one of the lights in the neighborhood 1505 was imaged.

Using the aforementioned light ID error detection techniques, it is determined that the demodulated ID of light 1510 at position <4,10> is not a part of the neighborhood set 1505. Furthermore, it is determined that IDs for lights at <3,3> and <2,2> are missing from the demodulated IDs for the neighborhood set 1505. It is also determined that m=1 (one light is missing—burnt out) and n=1 (one light has been erroneously decoded). By examining the image depicted in FIG. 15, one can account for all of the IDs except the one located at approximately the location <2,2>. The ID will be determined by minimizing the Euclidean distance between the real-world positions of the missing lights (once retrieved) and the real-world position of the observed light, i.e., the light recorded in the image at a position from which the erroneous ID was demodulated.

Position estimation of unidentified lights can be done by interpolation with respect to correctly decoded ID positions (which are known upon the return of the positions from database 808). For example, in FIG. 15 one can estimate the position of the unknown light (at <2,2>) as being roughly half-way between the lights at <1,2> and <3,2> in the x-axis direction, and half-way between the lights a <2,3> and <2,1> in the y-axis. Thus one can conclude the unknown light is in the vicinity of location <2,2>.

Illustrative Examples 1-11

FIGS. 16A-16K represent illustrative Examples 1-11, respectively, of light ID error detection and correction, falling under one of Case 1 (full set) and Case 2 (incomplete set). Depicted in each of Examples 1-11 from top-to-bottom, are the following:

One or more position tables, including an Expected Position Table that one would expect a light receiver to construct in the absence of errors, from which the real-world positions are to be used for photogrammetric determination;

A Constructed Position Table actually constructed based on the presence of the errors stipulated in the given example scenario. The Constructed Position Table may reveal that the IDs and their corresponding real-world positions may need to be updated in accordance with error detection and correction as described herein to result in a set of (i) correct IDs, (ii) real-world positions, and (iii) IDs that are properly placed in the light receiver image, i.e., assigned to their appropriate image positions. Such assigning is referred to as place-identifying the IDs in the image;

Cross-reference statistics, including a Histogram and statistics variables k, L, j, m, n, and p;

Actions to be performed to correct determined errors; and

Subsequently retrieved position information to correct errors.

Examples 1-11 are summarized in the following:

Example 1 (FIG. 16A)—Case 1 with 5 lights, no errors;

Example 2 (FIG. 16B)—Case 1 with 5 lights, 1 error. First peak for ID4 indicates ID4 is a valid missing ID and needs to be retrieved (along with its real-world position) to update the Constructed Position Table used for photogrammetric determination. Second peaks for IDs 1, 2, 3, 5 indicate these IDs are valid demodulated IDs. The absence of any peak at ID9 indicates ID9 is an invalid demodulated ID;

Example 3 (FIG. 16C)—Case 1 with 5 lights, 2 errors. First peaks indicate IDs 2, 3 are valid missing IDs and need to be retrieved to update the position table. Second peaks indicate 1, 3, 4 are valid demodulated IDs. Absences indicate invalid demodulated IDs 7, 14. Invalid IDs 7, 14 were demodulated from image positions in the light receiver. Therefore, Euclidean distances based on real-world positions of retrieved IDs 2, 3 are used to assign the retrieved IDs 2, 3 to correct ones of the image positions from which the invalid IDs 7, 14 were demodulated, so that the image positions for IDs 2, 3 correctly match their real-world positions;

Example 4 (FIG. 16D)—Case 1 with 5 lights, 3 errors;

Example 5 (FIG. 16E)—Case 1 with 4 lights, 1 error;

Example 6 (FIG. 16F)—Case 1 with 4 lights, 2 errors;

Example 7 (FIG. 16G)—Case 2 with 6 lights, 1 not observed;

Example 8 (FIG. 16H)—Case 2 with 5 lights, 1 error;

Example 9 (FIG. 16I)—Case 2 with 5 lights, 2 errors;

Example 10 (FIG. 16J)—Case 2 with 5 lights, 3 errors; and

Example 11 (FIG. 16K)—Case 2 with 6 lights, 2 missing.

Summary Flowcharts

FIG. 17 is a flowchart of an example summary method 1700 of light ID error detection and correction.

1705 includes, in light imager, recording images of spatially-separated light beams originating from a neighborhood of lights, each light beam modulated to indicate an identifier (ID) that identifies, and indexes a real-world position of, its originating light.

1710 includes determining positions of the recorded light beams in the images.

1715 includes demodulating the ID from each recorded light beam at the determined positions.

1720 includes retrieving a set of neighbor IDs for each demodulated ID. This results in a constructed light position table including an indexing ID, a corresponding real-world position, and the corresponding set of neighbor IDs.

1725 includes cross-referencing the demodulated IDs against the sets of neighbor IDs to reveal errors in the demodulated IDs. The cross-referencing reveals statistical consistencies between the demodulated IDs and the sets of the neighbor IDs that indicate valid IDs, and statistical inconsistencies that indicate valid missing IDs and invalid demodulated IDs. The cross-referencing may include generating a histogram having a first axis to represents a union of the demodulated IDs and the sets of neighbor IDs, and a second axis to represent how many times each ID on the first axis occurs in the sets of neighbor IDs, wherein histogram first peaks and second peaks, in the number of times each ID occurs, indicate missing IDs and valid IDs, respectively, and any absences of peaks indicate invalid demodulated IDs.

1730 includes correcting the errors to produce correct IDs each indexing a real-world position that is correctly matched to one of the determined light beam positions.

1735 includes photogrammetrically determining a position of the receiver based on the correctly matched real-world and determined light beam positions.

FIG. 18 is a flowchart of an example method expanding on the error correcting in 1730 from FIG. 17.

1805 includes retrieving any missing IDs, and corresponding real-world positions, identified by the cross-referencing in 1725. This includes updating the constructed position table constructed in 1720.

Together, 1810 and 1815 represent assigning each retrieved missing ID to one of the determined light beam positions, from which one of the invalid IDs was demodulated, that is a best fit for the retrieved missing ID. Such assigning is also referred to as place-identifying the retrieved IDs in the image based on the real-world Euclidean distance calculations.

More specifically, 1810 includes calculating a set of Euclidean distances for each retrieved missing ID relative to all of the valid IDs based on real-world positions corresponding to the retrieved missing ID and the valid IDs.

1815 includes assigning each retrieved missing ID to one of the determined light beam positions in 1710, from which one of the invalid IDs was demodulated in 1715, which minimizes the set of Euclidean distances to give the best fit.

Computer Processor System

FIG. 19 is a block diagram of an example computer processor system 1900 configured for multiphase sampling processing, including light transmitter processing such as light modulation, etc., and light receiver processing such as demodulation, etc., in accordance with examples described herein. In FIG. 19, various transmit and receive components/modules of computer system 1900 are depicted together for descriptive convenience. It is understood that various ones of the components/modules may reside in separate light transmitter and light receiver systems, as appropriate.

Computer system 1900 may include one or more instruction processing units, illustrated here as a processor 1902, which may include a processor, one or more processor cores, or a micro-controller.

Computer system 1900 may include memory, cache, registers, and/or storage, illustrated here as memory 1904.

Memory 1904 may include one or more non-transitory computer readable mediums encoded with a computer program, including instructions 1906.

Memory 1904 may include data 1908 to be used by processor 1902 in executing instructions 1906, and/or generated by processor 1902 during execution of instructions 1906. Data 1908 includes protocol information 1911, including light packet protocol definitions, frame periods, and so on, and recorded images 1913*a* from an imager, such as a camera, which may be received through the I/O interface. Data 1908 may also include data 1913*b*, including: position table information, such as indexing IDs, real-world positions, and neighbor lists; and cross-reference statistics, including histograms and statistical variables.

Instructions 1906 include instructions 1910*a* for light receiver (RX) processing of recorded images as described in one of the examples above, including photogrammetric position determination. Instructions 1910*a* include instructions for implementing a detector 1914, a receiver control/protocol processor 1916, and an exposure controller 1924, as described in one or more examples above. Detector instructions 1914 further include instructions for implementing a detector/demodulator 1922 such as a FSOOK or UFSOOK detector/demodulator, and a beam position determiner 1926, as described in one or more examples above. Instruction for implementing controller/processor 1916 include photogrammetric position determiner instructions 1916*a* to determine receiver positions in accordance with photogrammetric equations, light ID error detector and corrector instructions 1916*b* to detect and correct light ID errors, and light interface instructions 1916*c* to request and receive light information from a light database, as described in one or more examples above.

Instructions 1906 may also include instructions 1910*b* for a light transmitter operating in accordance with one or more multiphase sampling embodiments described above. Instructions 1910*b* include instructions 1917 for controlling the transmitter, and 1918 for implementing a modulator, such as a FSOOK modulator, as described in one or more examples above.

The instructions described above and depicted in FIG. 19 are also referred to as processing modules to implement the functions described in one or more examples above.

Wireless Communication Receiver System

FIG. 20 is a block diagram of an example system 2000 including a system or apparatus 2002 to sample and record light beams 2002*a* as a sequence of images and process the recorded images as described in one or more examples above, including photogrammetric position determination and light ID error detection and correction related to such position determination.

System 2002 may be implemented as described in one or more examples herein, including a light receiver. System 2000 may include a processor 2004.

System 2000 may include a communication system, including a transceiver, 2006 to interface between system 2002, processor system 2004, and a communication network over a channel 2008. Communication system 2006 may include a wired and/or wireless communication system. System 2002, such as a light receiver, may retrieve map light information from a remote light map database (not shown in FIG. 20) over communication channel 2008.

System 2000 or portions thereof may be implemented within one or more integrated circuit dies, and may be implemented as a system-on-a-chip (SoC).

System 2000 may include a user interface system 2010 to interface system 2010.

User interface system 2010 may include a monitor or display 2032 to display information from processor 2004.

User interface system 2010 may include a human interface device (HID) 2034 to provide user input to processor 2004. HID 2034 may include, for example and without limitation, one or more of a keyboard, a cursor device, a touch-sensitive device, and or a motion and/or imager. HID 2034 may include a physical device and/or a virtual device, such as a monitor-displayed or virtual keyboard.

User interface system 2010 may include an audio system 2036 to receive and/or output audible sound.

System 2000 may further include a transmitter system to transmit signals from system 2000.

System 2000 may correspond to, for example, a computer system, a personal communication device, and/or a television set-top box.

System 2000 may include a housing, and one or more of communication system 2002, digital processor system 2004, user interface system 2010, or portions thereof may be positioned within the housing. The housing may include, without limitation, a rack-mountable housing, a desk-top housing, a lap-top housing, a notebook housing, a net-book housing, a tablet housing, a set-top box housing, a portable housing, and/or other conventional electronic housing and/or future-developed housing. For example, communication system 2002 may be implemented to receive a digital television broadcast signal, and system 2000 may include a set-top box housing or a portable housing, such as a mobile telephone housing. System 2000 may be implemented in a camera-equipped smartphone, or may be implemented as part of a wireless router.

General Treatment of Photogrammetric Positioning

The principle of photogrammetric positioning is observing multiple visual features, assumed to be lights, such as LEDs in an LED constellation or array, with known positions such that the observer can ascertain their position relative to the LED constellation.

FIG. 21 is an illustration helpful in describing the principle of photogrammetric positioning, including the relevant equations. In FIG. 21, "camera" may be interpreted more generally as "light receiver," and both "image sensor" and "sensor" correspond to "light sensor."

With reference to FIG. 21, first, the following three coordinate systems involved with the positioning are defined.

2-D sensor coordinates

3-D camera coordinates

3-D "world" or "real-world" coordinates.

The basic process is as follows:

map the LED images into sensor coordinates described by vector <u,v> map the sensor coordinate points into camera coordinates described by vector $t_{cw}$ translate the origin of the camera coordinate system to real world coordinates described by vector $t_{wc}$.

The mapping of the light features onto the image sensor plane is based upon the collinearity condition given below.

$$u = -f \frac{s_1 \alpha + s_2 \beta + x_{cw} + s_3}{s_7 \alpha + s_8 \beta + z_{cw} + s_9} \quad \text{Eq. 1}$$

$$v = -f \frac{s_4 \alpha + s_5 \beta + y_{cw} + s_6}{s_7 \alpha + s_8 \beta + z_{cw} + s_9} \quad \text{Eq. 2}$$

We introduce the notation of $$u' \equiv \frac{u}{-f}, \quad v' \equiv \frac{v}{-f}$$

to rewrite equations 1 and 2 as $$u' = \frac{s_1 \alpha + s_2 \beta + x_{cw} + s_3}{s_7 \alpha + s_8 \beta + z_{cw} + s_9} \quad \text{Eq. 3}$$

$$v' = \frac{s_4 \alpha + s_5 \beta + y_{cw} + s_6}{s_7 \alpha + s_8 \beta + z_{cw} + s_9}. \quad \text{Eq. 4}$$

The $s_i$ values are related to the rotational inclination matrix, which is obtained as a decomposition of the general rotational matrix into its azimuth and inclination components $$R_{wc} = R_{wc}^a \cdot R_{wc}^i. \quad \text{Eq. 5}$$

Each element of $R_{wc}^i$ is directly determined by reading the inclination sensor which is assumed to be embedded within the image sensor. Because the viewing transformation from the point $x_w$ (world coordinates) to point $x_c$ (camera coordinates) is given by $x_c = (R_{wc}^i)^{-1} \cdot (R_{wc}^a) \cdot x_w + t_{cw}$, further equation manipulation will require that we utilize the inverses of the compound rotational matrix.

The components of the inverse azimuth rotational matrix, which need to be determined as part of the positioning calculations, are given by $$(R_{wc}^a)^{-1} = \begin{bmatrix} \cos\theta & 0 & -\sin\theta \\ 0 & 1 & 0 \\ \sin\theta & 0 & \cos\theta \end{bmatrix} = \begin{bmatrix} \alpha & 0 & -\beta \\ 0 & 1 & 0 \\ \beta & 0 & \alpha \end{bmatrix}.$$

The $s_i$ values are given by the relationship $$\begin{bmatrix} s_1 & s_2 & s_3 \\ s_4 & s_5 & s_6 \\ s_7 & s_8 & s_9 \end{bmatrix} = \begin{bmatrix} r_{11}^i x_w + r_{13}^i z_w & r_{13}^i x_w - r_{11}^i z_w & r_{12}^i y_w \\ r_{21}^i x_w + r_{23}^i z_w & r_{23}^i x_w - r_{21}^i z_w & r_{22}^i y_w \\ r_{31}^i x_w + r_{33}^i z_w & r_{33}^i x_w - r_{31}^i z_w & r_{32}^i y_w \end{bmatrix} \quad \text{Eq. 7}$$

where the $[r_{mn}^i]$ values are determined by the inverse of the inclination matrix as $$(R_{wc}^i)^{-1} = \begin{bmatrix} r_{11}^i & r_{12}^i & r_{13}^i \\ r_{21}^i & r_{22}^i & r_{23}^i \\ r_{31}^i & r_{32}^i & r_{33}^i \end{bmatrix}. \quad \text{Eq. 8}$$

Equations 3 and 4 can be manipulated into a system of linear equations as $$u's_7\alpha + u's_8\beta + u'z_{cw} + u's_9 = s_1\alpha + s_2\beta + x_{cw} + s_3$$
$$\alpha(u's_7 - s_1) + \beta(u's_8 - s_2) - x_{cw} + u'z_{cw} = s_3 - u's_9$$
Eq. 9

$$v's_7\alpha + v's_8\beta + v'z_{cw} + v's_9 = s_4\alpha + s_5\beta + y_{cw} + s_6$$
$$\alpha(v's_7 - s_4) + \beta(v's_8 - s_5) - y_{cw} + v'z_{cw} = s_6 - v's_9.$$
Eq. 10

Equations 9 and 10 can be put into matrix form as $$\begin{bmatrix} u's_7 - s_1 & u's_8 - s_2 & -1 & 0 & u' \\ v's_7 - s_4 & v's_8 - s_5 & 0 & -1 & v' \end{bmatrix} \begin{bmatrix} \alpha \\ \beta \\ x_{cw} \\ y_{cw} \\ z_{cw} \end{bmatrix} = \begin{bmatrix} s_3 - u's_9 \\ s_6 - v's_9 \end{bmatrix}.$$
Eq. 11

For the $i^{th}$ light feature we define $$A_i = \begin{bmatrix} u's_7 - s_1 & u's_8 - s_2 & -1 & 0 & u' \\ v's_7 - s_4 & v's_8 - s_5 & 0 & -1 & v' \end{bmatrix}$$
Eq. 12

$$p = \begin{bmatrix} \alpha \\ \beta \\ x_{cw} \\ y_{cw} \\ z_{cw} \end{bmatrix}$$
Eq. 13

$$t_{cw} = \begin{bmatrix} x_{cw} \\ y_{cw} \\ z_{cw} \end{bmatrix}$$

$$\therefore p = \begin{bmatrix} \alpha \\ \beta \\ t_{cw} \end{bmatrix}$$

$$b_i = \begin{bmatrix} s_3 - u's_9 \\ s_6 - v's_9 \end{bmatrix}$$
Eq. 14 such that $A_i \cdot p = b_i$.

When multiple features are detected, a system of linear simultaneous equations describing p can be obtained that performs a least mean square estimate as $$p = \begin{bmatrix} A_1 \\ A_2 \\ \vdots \\ A_n \end{bmatrix}^+ \begin{bmatrix} b_1 \\ b_2 \\ \vdots \\ b_n \end{bmatrix}$$
Eq. 15 where i>=3 (i.e. >=3 features), with at least 3 features being non-collinear, and the superscript$^+$ notation indicates the pseudo-inverse operation.

The camera origin is then translated and rotated such that its location is in terms of world coordinates, which yields the desired solution of $$t_{wc} = -R_{wc} \cdot t_{cw}.$$
Eq. 16

The camera azimuth orientation angle is derived from Eq. 13 as $$\theta = \operatorname{atan2}\left(\frac{\beta}{\alpha}\right).$$
Eq. 17

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program, method, apparatus, and system embodiments are described herein.

A. A Computer Program Product (CPP) Embodiment

A CPP embodiment includes a non-transitory computer readable medium encoded with a computer program, including instructions to cause a processor to:

access a recording of images of spatially-separated light beams originating from a neighborhood of lights, each light beam modulated to indicate an identifier (ID) that identifies, and indexes a real-world position of, its originating light;

determine positions of the recorded light beams in the images;

demodulate the ID from each recorded light beam;

retrieve a set of neighbor IDs for each demodulated ID;

cross-reference the demodulated IDs against the sets of neighbor IDs to reveal errors in the demodulated IDs;

correct the errors to produce correct IDs each indexing a real-world position that is correctly matched to one of the determined light beam positions; and photogrammetrically determine a position of the receiver based on the correctly matched real-world and the determined light beam positions.

The cross-reference may reveal:

valid demodulated IDs and any missing IDs which together comprise the correct IDs; and invalid demodulated IDs.

The cross-reference may also reveal:

statistical consistencies between the demodulated IDs and the sets of the neighbor IDs that indicate the valid IDs; and statistical inconsistencies that indicate the missing IDs and invalid demodulated IDs.

The instructions to cross-reference may include instructions to cause the processor to:

generate a histogram having a first axis to represents a union of the demodulated IDs and the sets of neighbor IDs, and a second axis to represent how many times each ID on the first axis occurs in the sets of neighbor IDs, wherein first peaks and second peaks in the number of times each ID occurs indicate missing IDs and valid IDs, respectively.

The instructions to correct may include instructions to cause the processor to:
retrieve the missing IDs; and
assign each retrieved missing ID to one of the determined light beam positions, from which one of the invalid IDs was demodulated, that is a best fit for the retrieved missing ID.

The instructions to assign may include instructions to cause the processor to:
calculate a set of Euclidean distances for each retrieved missing ID relative to all of the valid IDs based on real-world positions corresponding to the retrieved missing ID and the valid IDs; and
assign each retrieved missing ID to one of the determined light beam positions, from which one of the invalid IDs was demodulated, that minimizes the set of Euclidean distances to give the best fit.

The instructions to cause the processor to retrieve may include instructions to cause the processor to retrieve a real-world position, in addition to the set of neighbor IDs, for each demodulated ID.

B. Apparatus Embodiment

An apparatus embodiment comprises:
a light imager to record images of spatially-separated light beams originating from a neighborhood of lights, each light beam modulated to indicate an identifier (ID) that identifies, and indexes a real-world position of, its originating light; and
processing modules to:
determine positions of the recorded light beams in the images;
demodulate the ID from each recorded light beam;
retrieve a set of neighbor IDs for each demodulated ID;
cross-reference the demodulated IDs against the sets of neighbor IDs to reveal errors in the demodulated IDs;
correct the errors to produce correct IDs each indexing a real-world position that is correctly matched to one of the determined light beam positions; and
photogrammetrically determine a position of the receiver based on the correctly matched real-world and the determined light beam positions.

The cross-reference may reveal:
valid demodulated IDs and any missing IDs which together comprise the correct IDs; and
invalid demodulated IDs.

The cross-reference may further reveal:
statistical consistencies between the demodulated IDs and the sets of the neighbor IDs that indicate the valid IDs; and
statistical inconsistencies that indicate the missing IDs and invalid demodulated IDs.

The processing modules to cross-reference may be configured to generate a histogram having
a first axis to represents a union of the demodulated IDs and the sets of neighbor IDs, and
a second axis to represent how many times each ID on the first axis occurs in the sets of neighbor IDs,
wherein first peaks and second peaks in the number of times each ID occurs indicate missing IDs and valid IDs, respectively.

The processing modules to correct may be configured to:
retrieve the missing IDs; and
assign each retrieved missing ID to one of the determined light beam positions, from which one of the invalid IDs was demodulated, that is a best fit for the retrieved missing ID.

The processing modules to assign may be configured to:
calculate a set of Euclidean distances for each retrieved missing ID relative to all of the valid IDs based on real-world positions corresponding to the retrieved missing ID and the valid IDs; and
assign each retrieved missing ID to one of the determined light beam positions, from which one of the invalid IDs was demodulated, that minimizes the set of Euclidean distances to give the best fit.

The processing modules to retrieve may further include processing modules to retrieve a real-world position, in addition to the set of neighbor IDs, for each demodulated ID.

The apparatus may further comprise:
a communication system to communicate with a network;
a processor to interface between the communication system and a user interface system; and
a housing,
wherein the processor, the communication system, and the light transmitter are positioned within the housing.

The communication system may include a wireless communication system; and
the housing includes a mobile hand-held housing to house the communication system, the processor, the user interface system, and a battery.

C. Method Embodiment

A method embodiment comprises: A method, comprising:
in a receiver, recording images of spatially-separated light beams originating from a neighborhood of lights, each light beam modulated to indicate an identifier (ID) that identifies, and indexes a real-world position of, its originating light;
determining positions of the recorded light beams in the images;
demodulating the ID from each recorded light beam;
retrieving a set of neighbor IDs for each demodulated ID;
cross-referencing the demodulated IDs against the sets of neighbor IDs to reveal errors in the demodulated IDs;
correcting the errors to produce correct IDs each indexing a real-world position that is correctly matched to one of the determined light beam positions; and
photogrammetrically determining a position of the receiver based on the correctly matched real-world and the determined light beam positions.

The cross-referencing may reveals:
valid demodulated IDs and any missing IDs which together comprise the correct IDs; and
invalid demodulated IDs.

The cross-referencing may further reveal:
statistical consistencies between the demodulated IDs and the sets of the neighbor IDs that indicate the valid IDs; and
statistical inconsistencies that indicate the missing IDs and invalid demodulated IDs.

The cross-referencing may includes:
generating a histogram having
a first axis to represents a union of the demodulated IDs and the sets of neighbor IDs, and
a second axis to represent how many times each ID on the first axis occurs in the sets of neighbor IDs,
wherein first peaks and second peaks in the number of times each ID occurs indicate missing IDs and valid IDs, respectively.

The correcting may include:
retrieving the missing IDs; and
assigning each retrieved missing ID to one of the determined light beam positions, from which one of the invalid IDs was demodulated, that is a best fit for the retrieved missing ID.

The assigning may include:
calculating a set of Euclidean distances for each retrieved missing ID relative to all of the valid IDs based on real-world positions corresponding to the retrieved missing ID and the valid IDs; and
assigning each retrieved missing ID to one of the determined image positions image positions, from which one of the invalid IDs was demodulated, that minimizes the set of Euclidean distances to give the best fit.

The retrieving may include retrieving a real-world position, in addition to the set of neighbor IDs, for each demodulated ID.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program, including instructions to cause a processor to:
   access a recording of images of spatially-separated light beams originating from a neighborhood of lights, each light beam modulated to indicate an identifier (ID) that identifies, and indexes a real-world position of, its originating light;
   determine positions of the recorded light beams in the images;
   demodulate the ID from each recorded light beam;
   retrieve a set of neighbor IDs for each demodulated ID;
   cross-reference the demodulated IDs against the sets of neighbor IDs to reveal errors in the demodulated IDs;
   correct the errors to produce correct IDs each indexing a real-world position that is correctly matched to one of the determined light beam positions; and
   photogrammetrically determine a position of the receiver based on the correctly matched real-world and the determined light beam positions.

2. The computer readable medium of claim 1, wherein the cross-reference reveals:
   valid demodulated IDs and any missing IDs which together comprise the correct IDs; and
   invalid demodulated IDs.

3. The computer readable medium of claim 2, wherein the cross-reference reveals:
   statistical consistencies between the demodulated IDs and the sets of the neighbor IDs that indicate the valid IDs; and
   statistical inconsistencies that indicate the missing IDs and invalid demodulated IDs.

4. The computer readable medium of claim 3, wherein the instructions to cross-reference include instructions to cause the processor to:
   generate a histogram having
      a first axis to represents a union of the demodulated IDs and the sets of neighbor IDs, and
      a second axis to represent how many times each ID on the first axis occurs in the sets of neighbor IDs,
      wherein first peaks and second peaks in the number of times each ID occurs indicate missing IDs and valid IDs, respectively.

5. The computer readable medium of claim 2, wherein the instructions to correct include instructions to cause the processor to:
   retrieve the missing IDs; and
   assign each retrieved missing ID to one of the determined light beam positions, from which one of the invalid IDs was demodulated, that is a best fit for the retrieved missing ID.

6. The computer readable medium of claim 5, wherein the instructions to assign include instructions to cause the processor to:
   calculate a set of Euclidean distances for each retrieved missing ID relative to all of the valid IDs based on real-world positions corresponding to the retrieved missing ID and the valid IDs; and
   assign each retrieved missing ID to one of the determined light beam positions, from which one of the invalid IDs was demodulated, that minimizes the set of Euclidean distances to give the best fit.

7. The computer readable medium of claim 1, wherein the instructions to cause the processor to retrieve include instructions to cause the processor to retrieve a real-world position, in addition to the set of neighbor IDs, for each demodulated ID.

8. A apparatus, comprising:
   processing modules to:
      access a recording of images of spatially-separated light beams originating from a neighborhood of lights, each light beam modulated to indicate an identifier (ID) that identifies, and indexes a real-world position of, its originating light;
      determine positions of the recorded light beams in the images;
      demodulate the ID from each recorded light beam;
      retrieve a set of neighbor IDs for each demodulated ID;
      cross-reference the demodulated IDs against the sets of neighbor IDs to reveal errors in the demodulated IDs;
      correct the errors to produce correct IDs each indexing a real-world position that is correctly matched to one of the determined light beam positions; and
      photogrammetrically determine a position of the receiver based on the correctly matched real-world and the determined light beam positions.

9. The apparatus of claim 8, wherein the cross-reference reveals:
   valid demodulated IDs and any missing IDs which together comprise the correct IDs; and
   invalid demodulated IDs.

10. The apparatus of claim 9, wherein the cross-reference further reveals:
   statistical consistencies between the demodulated IDs and the sets of the neighbor IDs that indicate the valid IDs; and
   statistical inconsistencies that indicate the missing IDs and invalid demodulated IDs.

11. The apparatus of claim 10, wherein the processing modules to cross-reference are configured to generate a histogram having
   a first axis to represents a union of the demodulated IDs and the sets of neighbor IDs, and
   a second axis to represent how many times each ID on the first axis occurs in the sets of neighbor IDs, wherein first peaks and second peaks in the number of times each ID occurs indicate missing IDs and valid IDs, respectively.

12. The apparatus of claim 9, wherein the processing modules to correct are configured to:
retrieve the missing IDs; and
assign each retrieved missing ID to one of the determined light beam positions, from which one of the invalid IDs was demodulated, that is a best fit for the retrieved missing ID.

13. The apparatus of claim 12, wherein the processing modules to assign are configured to:
calculate a set of Euclidean distances for each retrieved missing ID relative to all of the valid IDs based on real-world positions corresponding to the retrieved missing ID and the valid IDs; and
assign each retrieved missing ID to one of the determined light beam positions, from which one of the invalid IDs was demodulated, that minimizes the set of Euclidean distances to give the best fit.

14. The apparatus of claim 8, wherein the processing modules to retrieve further include processing modules to retrieve a real-world position, in addition to the set of neighbor IDs, for each demodulated ID.

15. The apparatus of claim 8, further comprising:
a light imager to record the images;
a communication system to communicate with a network;
a processor and memory to interface between the communication system and a user interface system; and
a housing,
wherein the light imager, the processor and memory, and the communication system, are positioned within the housing.

16. The apparatus of claim 15, wherein:
the communication system includes a wireless communication system; and
the housing includes a mobile hand-held housing to house the communication system, the processor, the user interface system, and a battery.

17. A method, comprising:
in a receiver, recording images of spatially-separated light beams originating from a neighborhood of lights, each light beam modulated to indicate an identifier (ID) that identifies, and indexes a real-world position of, its originating light;
determining positions of the recorded light beams in the images;
demodulating the ID from each recorded light beam;
retrieving a set of neighbor IDs for each demodulated ID;
cross-referencing the demodulated IDs against the sets of neighbor IDs to reveal errors in the demodulated IDs;
correcting the errors to produce correct IDs each indexing a real-world position that is correctly matched to one of the determined light beam positions; and
photogrammetrically determining a position of the receiver based on the correctly matched real-world and the determined light beam positions.

18. The method of claim 17, wherein the cross-referencing reveals:
valid demodulated IDs and any missing IDs which together comprise the correct IDs; and
invalid demodulated IDs.

19. The method of claim 18, wherein the cross-referencing reveals:
statistical consistencies between the demodulated IDs and the sets of the neighbor IDs that indicate the valid IDs; and
statistical inconsistencies that indicate the missing IDs and invalid demodulated IDs.

20. The method of claim 19, wherein the cross-referencing includes:
generating a histogram having
a first axis to represents a union of the demodulated IDs and the sets of neighbor IDs, and
a second axis to represent how many times each ID on the first axis occurs in the sets of neighbor IDs,
wherein first peaks and second peaks in the number of times each ID occurs indicate missing IDs and valid IDs, respectively.

21. The method of claim 18, wherein the correcting includes:
retrieving the missing IDs; and
assigning each retrieved missing ID to one of the determined light beam positions, from which one of the invalid IDs was demodulated, that is a best fit for the retrieved missing ID.

22. The method of claim 21, wherein the assigning includes:
calculating a set of Euclidean distances for each retrieved missing ID relative to all of the valid IDs based on real-world positions corresponding to the retrieved missing ID and the valid IDs; and
assigning each retrieved missing ID to one of the determined image positions image positions, from which one of the invalid IDs was demodulated, that minimizes the set of Euclidean distances to give the best fit.

23. The method of claim 17, wherein the retrieving includes retrieving a real-world position, in addition to the set of neighbor IDs, for each demodulated ID.

\* \* \* \* \*